United States Patent [19]

Ohno et al.

[11] Patent Number: 5,013,636
[45] Date of Patent: * May 7, 1991

[54] SILVER HALIDE COLOR PHOTOGRAPHIC MATERIALS

[75] Inventors: Shigeru Ohno; Yoshihiro Jimbo; Keiichi Adachi; Shigeru Kuwashima, all of Kanagawa, Japan

[73] Assignee: Fuji Photo Film Co., Ltd., Kanagawa, Japan

[*] Notice: The portion of the term of this patent subsequent to Jun. 19, 2007 has been disclaimed.

[21] Appl. No.: 321,829

[22] Filed: Mar. 10, 1989

[30] Foreign Application Priority Data

Mar. 10, 1988 [JP] Japan .................................. 63-57302

[51] Int. Cl.$^5$ .......................... G03C 1/40; G03C 7/38
[52] U.S. Cl. .................................. 430/522; 430/558; 430/595
[58] Field of Search ........................ 430/522, 558, 595

[56] References Cited

U.S. PATENT DOCUMENTS

| | | | |
|---|---|---|---|
| 4,294,917 | 10/1981 | Postle et al. ........................ | 430/522 |
| 4,755,455 | 7/1988 | Iwasa ................................ | 430/558 |
| 4,770,984 | 9/1988 | Ailliet et al. ......................... | 430/522 |
| 4,935,337 | 6/1990 | Kuwashima et al. ................ | 430/522 |

FOREIGN PATENT DOCUMENTS 1521083 8/1978 United Kingdom ................ 430/522

*Primary Examiner*—Richard L. Schilling
*Attorney, Agent, or Firm*—Sughrue, Mion, Zinn, Macpeak & Seas

[57] ABSTRACT

A silver halide color photographic material comprising a support having in a layer thereon at least a dye represented by general formula (I)

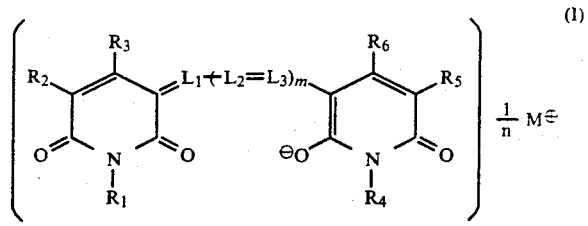

wherein $R_1$ and $R_4$, which may be the same or different, each represents a hydrogen atom, an aliphatic group, an aromatic group, a heterocyclic group, $-NR_7R_8$, $-NR_7CONR_7R_8$, $-NR_8COR_9$ or $-NR_8SO_2R_9$;

$R_2$ and $R_5$, which may be the same or different, each represents a hydrogen atom, an aliphatic group, an aromatic group, a heterocyclic group, a cyano group, a sulfonic acid group, $-NR_7R_8$, $-NR_8COR_9$, $-NR_8SO_2R_9$, $-NR_7CONR_7R_8$, $-COOR_7$, $-CONR_7R_8$, $-COR_9$, $-SO_2R_9$ or $-SO_2NR_7R_8$;

$R_3$ amd $R_6$, which may be the same or different, each represents a hydrogen atom, an aliphatic group, an aromatic group, a heterocyclic group, $-OR_7$, $-COOR_7$, $-COR_9$, $-CONR_7R_8$, $-NR_7R_8$, $-NR_8COR_9$ or $-NR_8SO_2R_9$, $-NR_7CONR_7R_8$, $-SO_2R_9$, $SO_2NR_7R_8$, $-OR_7$ or cyano group, where $R_7$ and $R_8$, which may be the same or different, each represents a hydrogen atom, an aliphatic group or an aromatic gruup;

$R_9$ represents an aliphatic group or an aromatic group; and $R_7$ and $R_8$ or $R_8$ and $R_9$ may combine to form a 5- or 6-membered ring;

$L_1$, $L_2$ and $L_3$ each represents a methine group, m represents 0, 1, or 2; and $M^{\oplus}$ represents a cation of valency n where n represents 1, 2 or 3;

and least a coupler represented by general formula (II)

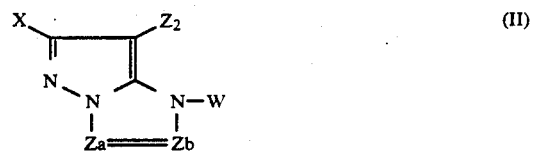

wherein X represents a hydrogen atom or a substituent group; $Z_2$ represents a hydrogen atom or coupling leaving group; W represents a hydrogen atom, an acyl group, an aliphatic sulfonyl group or an aromatic sulfonyl group; and Za and Zb represent methine, substituted methine or $-N=$; and dimers or higher oligomers involving X, $Z_2$ or Za, or Zb as substituted methine.

5 Claims, No Drawings

SILVER HALIDE COLOR PHOTOGRAPHIC MATERIALS

FIELD OF THE INVENTION

This invention relates to silver halide color photographic materials having dyed hydrophilic colloid layers and, more specifically, it relates to silver halide color photographic materials which contain magenta couplers having excellent spectral absorption characteristics, and moreover which contain dyes which as well as being photochemically inactive are also easily decolored and/or eluted during photographic processing.

BACKGROUND OF THE INVENTION

Color formation is often carried out in the photographic emulsion layers or other layers in silver halide photographic materials in order to absorb light in a specific wavelength range.

Colored layers known as filter layers provided remote from the support are provided to control the spectral composition of the light incident upon the photographic emulsion layers, and colored layers known as antihalation layers are provided between the photographic emulsion layers and the support or on the surface opposite the photographic emulsion layers of the support in order to prevent the image fading, i.e., halation, caused by the scattering of light after passage or transmittance through the photographic emulsion layers and by incidence upon the photographic emulsion layers for a second time after reflection by interfaces or surfaces. With multilayer color sensitive materials, antihalation layers are placed between every layer.

Photographic emulsion layers are also colored to prevent a deterioration in image sharpness caused by the scattering of light in the photographic emulsion layers (this phenomenon is generally known as irradiation).

There are many cases in which the layers to be colored are formed from hydrophilic colloids, and water-soluble dyes are therefore usually included in the layers in order to color them. These dyes must satisfy the following conditions:

1. They must have an appropriate spectral absorption suited to the intended use.
2. They must be photochemically inactive. In other words, chemically speaking, they must not impart any adverse effects, such as a reduction in speed, latent image fading or fogging, on the properties of the silver halide photographic emulsion layer.
3. They must be decolored or removed by dissolution during photographic processing and must not leave any detrimental coloration on the photosensitive materials after processing.

There have been many efforts by those in the industry to discover dyes which satisfy these conditions and the dyes given below are known. Examples include oxonol dyes having pyrazolone nuclei or barbituric acid nuclei as disclosed in, for example, G.B. Patents 506,385, 1,177,429, 1,311,884, 1,338,799, 1,385,371, 1,467,214, 1,433,102 and 1,553,516, JP-A-48-85130, JP-A-49-114420, JP-A-55-161233, JP-A-59-111640 and JP-A-62-273527 (the term "JP-A" as used herein refers to a "published unexamined Japanese patent application") and in U.S. Pat. Nos. 3,247,127, 3,469,985 and 4,078,933, and the oxonol dyes having hydroxypyridone nuclei as disclosed, for example, in G.B. Patents 1,278,621, 1,512,863, 1,521,083 and 1,579,899.

Of these, oxonol dyes having two hydroxypyridone nuclei are decolored in development solutions containing sulfite salts and exert little adverse effect on the photographic emulsion.

However, even though dyes belonging to this family have little effect on the photographic emulsion itself, they have the disadvantage that they may spectrally sensitize spectrally sensitized emulsions in unnecessary regions and that they may cause a reduction in speed which is thought to originate in the desorption of the sensitizing dye.

Furthermore, they may remain after processing due to the increasing speed of development processing which has come into practice in recent years. It has been proposed to use dyes with a high reactivity with sulfite ions in order to solve this problem, but this approach has the disadvantages that the stability within the photographic film is not sufficient, there is a reduction in density on aging and it is not possible to obtain the desired photographic effects.

On the other hand, open chain ketomethylene couplers are used as yellow image-forming couplers, and phenol-based and naphthol-based couplers are used as the cyan image-forming couplers, for the color image-forming couplers used in color photographic materials. 5-Pyrazolone-based couplers have long been used as magenta image-forming couplers. However, recently proposals have been made for coupler structures which eliminate secondary absorption at about 430 nm for magenta dyes formed from 5-pyrazolone-based couplers, as is known from, for example, U.S. Pat. Nos. 3,369,897 and 3,725,067, JP-A-59-162548, JP-A-59-171956, JP-A-59-228252 and JP-A-60-33552 and Published International Applications (WO) 86-1915 and JP-A-61-65245. In particular, pyrazoloazole-based couplers are excellent couplers for red color reproduction and have come to be used as one component in color photographic materials in recent years.

However, despite the improvements in spectral absorption characteristics of pyrazoloazole-based couplers, they still have the disadvantage that they do not exhibit desirable color reproduction or sharpness when they are combined in oxonol dyes having the previously mentioned pyrazolone nuclei or hydroxypyridone nuclei.

SUMMARY OF THE INVENTION

An object of this invention is to provide high picture quality silver halide color photographic materials which, due to the combined use of a magenta image-forming coupler which has outstanding color reproduction and a novel water-soluble dye which is stable even to aging and which has outstanding decoloring properties upon processing and does not impart a detrimental effect on the photographic properties of silver halide emulsion layers, have even more outstanding color reproduction properties and sharpness.

The object of this invention is achieved by including at least one kind of dye represented by general formula (I) and a coupler which can be represented by general formula (II).

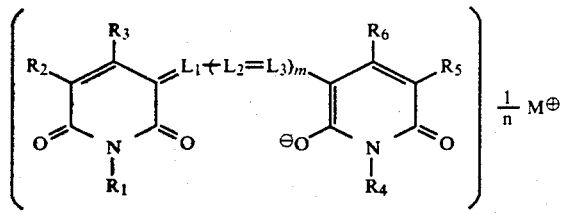

wherein $R_1$ and $R_4$, which may be the same or different, each represents a hydrogen atom, an aliphatic group, an aromatic group, a heterocyclic group, $-NR_7R_8$, $-NR_7CONR_7R_8$, $-NR_8COR_9$ or $-NR_8SO_2R_9$; $R_2$ and $R_5$, which may be the same or different, each represents a hydrogen atom, an aliphatic group, an aromatic group, a heterocyclic group, a cyano group, a sulfonic acid group, $-NR_7R_8$, $-NR_8COR_9$, $-NR_8SO_2R_9$, $-NR_7CONR_7R_8$, $-COOR_7$, $-CONR_7R_8$, $-COR_9$, $-SO_2R_9$ or $-SO_2NR_7R_8$; and $R_3$ and $R_6$, which may be the same or different, each represents a hydrogen atom, an aliphatic group, an aromatic group, a heterocyclic group, $-OR_7$, $-COOR_7$, $-COR_9$, $-CONR_7R_8$, $-NR_7R_8$, $-NR_8COR_9$ or $-NR_8SO_2R_9$, $-NR_7CONR_7R_8$, $-SO_2R_9$, $-SO_2NR_7R_8$, $-OR_7$ or a cyano group, where $R_7$ and $R_8$, which may be the same or different, each represents a hydrogen atom, an aliphatic group or an aromatic group; $R_9$ represents an aliphatic group or an aromatic group and $R_7$ and $R_8$ or $R_8$ and $R_9$ may combine to form a 5- or 6-membered ring; $L_1$, $L_2$ and $L_3$ each represents a methine group, m represents 0, 1 or 2 and $M^\oplus$ represents a cation of valency n where n represents 1, 2 or 3. In the above description, the aliphatic groups preferably contain 1 to 8 carbon atoms and the aromatic groups preferably contain 6 to 10 carbon atoms.

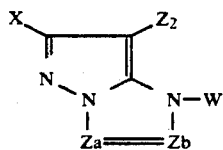

wherein X represents a hydrogen atom or a substituent group; $Z_2$ represents a hydrogen atom or a coupling releasable group; W represents a hydrogen atom, an acyl group or an aliphatic or aromatic sulfonyl group; and Za and Zb represent methine, substituted methine or $-N=$. Dimers or higher oligomers with X, $Z_2$ or Za, Zb substituted methine may be formed.

DETAILED DESCRIPTION OF THE INVENTION

The dyes represented by general formula (I) are explained in detail below.

The aliphatic groups represented by R, $R_2$, $R_3$, $R_4$, $R_5$, $R_6$, $R_8$, or $R_9$ are each preferably an unsubstituted alkyl group (for example, methyl, ethyl, n-butyl, isopropyl, sec-butyl, n-hexyl), a substituted alkyl group [with, as preferred substituent groups, halogen atoms such as F, Cl or Br (for example, 2-chloroethyl, trifluoromethyl, difluoromethyl, 1,1,2,2-tetrafluoroethyl), a phenyl group (for example, benzyl, phenethyl, 4-chlorobenzyl, 4-methoxybenzyl, 2-sulfobenzyl, 4-sulfobenzyl, 4-sulfophenethyl, 4-sulfopropyloxybenzyl), a hydroxyl group (for example, 2-hydroxyethyl, 3-hydroxypropyl), a cyano group (for example, 2-cyanoethyl), a carboxyl group (for example, carboxymethyl, 2-carboxyethyl, 4-carboxybutyl), a sulfonic acid group (for example, sulfomethyl, 2-sulfoethyl, 3-sulfopropyl, 4-sulfobutyl, 6-sulfohexyl), an alkoxy group (for example, 2-methoxyethyl, 2-(2-hydroxyethoxy)ethyl, ethoxyethyl), an amino group (for example, dimethylamino, diethylamino) or ester group (for example, ethoxycarbonylmethyl, 2-methoxycarbonylethyl)] or a cycloalkyl group (for example, cyclopentyl, cyclohexyl).

The aromatic groups represented by $R_1$, $R_2$, $R_3$, $R_4$, $R_5$, $R_6$, $R_7$, $R_8$ or $R_9$ are each preferably an unsubstituted aryl group (for example, phenyl, naphthyl) or a substituted aryl group [with, as preferred substituent groups, a sulfonic acid group (for example, 3-sulfophenyl, 4-sulfophenyl, 2,5-disulfophenyl, 3,5-disulfophenyl, 2,4-disulfophenyl), a carboxyl group (for example, 2-carboxyphenyl, 4-carboxyphenyl), an alkoxy group (for example, 4-methoxyphenyl, 4-(3-sulfopropyloxy)phenyl, 4-methoxy-3-sulfophenyl), an alkyl group (for example, p-tolyl, 2-methyl-4-sulfophenyl), a hydroxyl group (for example, 3-hydroxyphenyl, 4-hydroxyphenyl), an amino group (for example, 4-dimethylaminophenyl, 4-diethylaminophenyl, 3-[N-methyl-N-(2-sulfoethyl)amino]phenyl, a cyano group (for example, 4-cyanophenyl) or an ester group (for example, 4-ethoxycarbonylphenyl)].

The heterocyclic groups represented by $R_1$, $R_2$, $R_3$, $R_4$, $R_5$, or $R_6$ are each preferably 5- or 6-membered heterocyclic groups containing at least one nitrogen atom (for example, 2-pyridyl, 5-sulfobenzimidazol-2-yl, 5-carboxybenzothiazol-2-yl, morpholino, piperidino).

The 5- and 6-membered rings which are formed when $R_7$ and $R_8$ or $R_8$ and $R_9$ link include, for example, piperidine rings, pyrrolidine rings, morpholine rings and pyrrolidone rings.

The methine groups represented by $L_1$, $L_2$ or $L_3$ preferably represent unsubstituted methine groups although they may have substituent groups (for example, methyl, ethyl, sulfoethyl, chlorine, cyano).

$M^{n\oplus}$ represents a cation of valency n (where, n represents 1, 2 or 3) (for example, $H^\oplus$, $Na^\oplus$, $K^\oplus$, $Ca^{2\oplus}$, $NH_4^\oplus$, $NH(C_2H_5)_3$, $(n-C_4H_9)_4N^\oplus$,

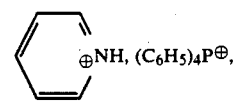

$(HOCH_2)_4P^\oplus$).

When general formula (I) has a sulfonic acid group or a carboxyl group, these groups may be in the form of the free acid or of a salt thereof (for example, inorganic salts of Na, K, NH$_4$, etc., or organic amine salts of triethylammonium, pyridinium, etc.).

In general formula (I), it is preferred that $R_1$, $R_2$, $R_3$, $R_4$, $R_5$ and $R_6$ represent sulfonic acid groups or carboxyl groups or represent groups having at least 1 sulfonic acid group or carboxyl group, and it is more preferred that $R_2$ and $R_5$ represent a cyano group or a substituted or unsubstituted carbamoyl group and $R_1$ and $R_4$ represent a group having at least 1 sulfonic acid group or carboxyl group.

Specific examples of dyes represented by general formula (I) are given below but this invention is not to be construed as being limited to these.

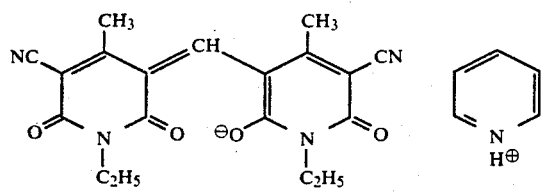 I-1
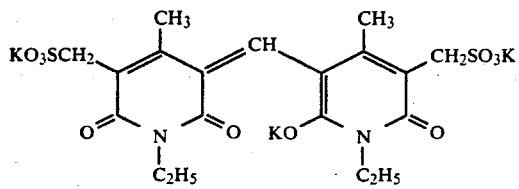 I-2
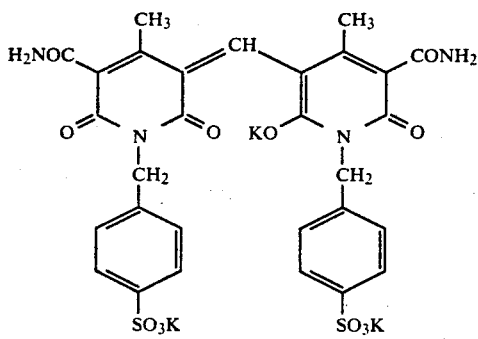 I-3
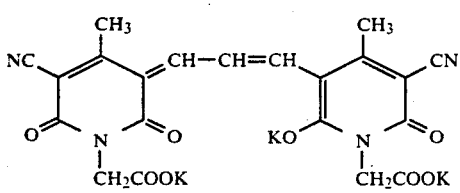 I-4
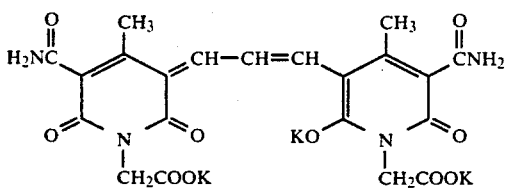 I-5
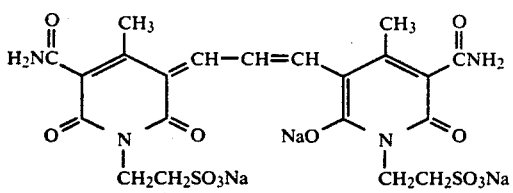 I-6
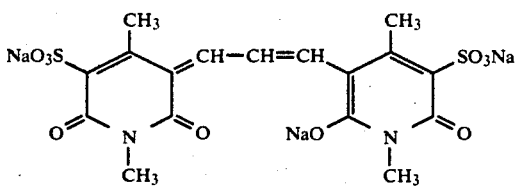 I-7
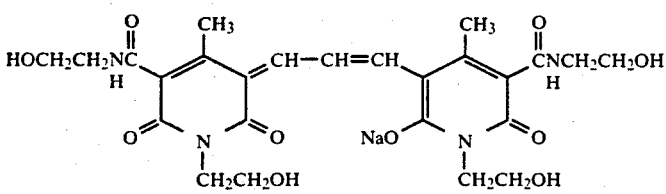 I-8

-continued
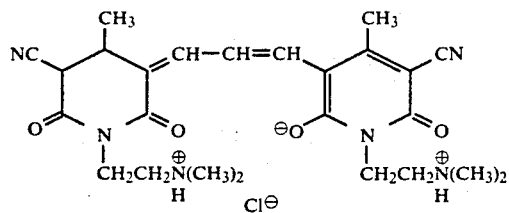    I-9
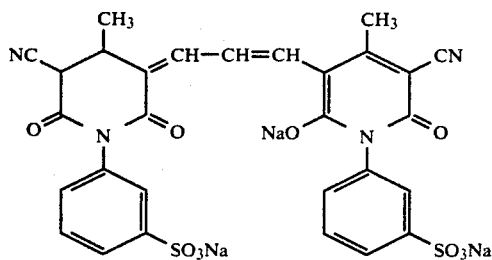    I-10
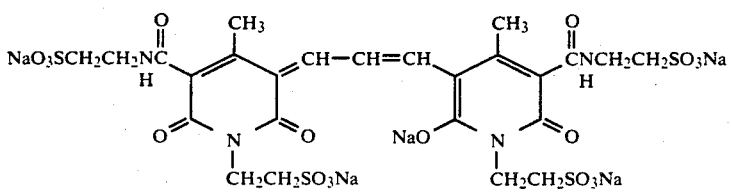    I-11
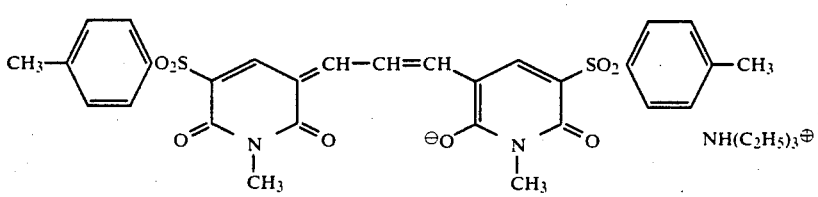    I-12
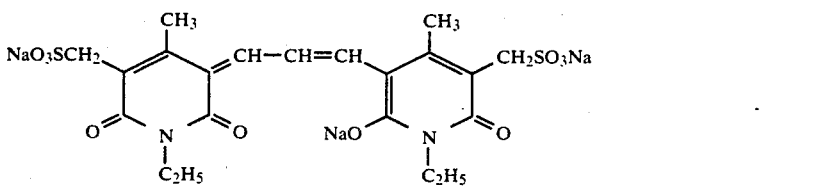    I-13
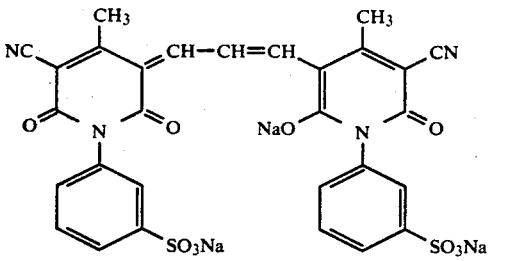    I-14
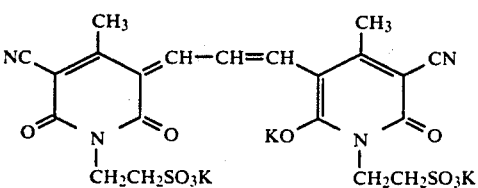    I-15

I-16
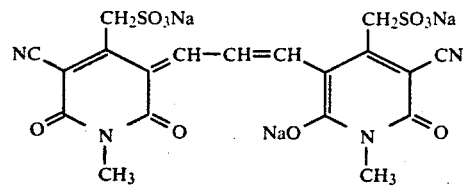
I-17
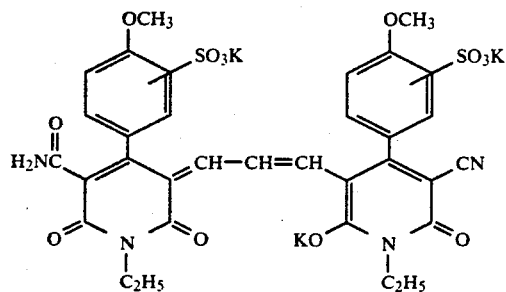
I-18
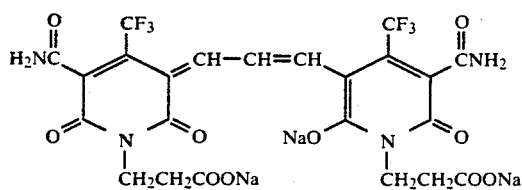
I-19
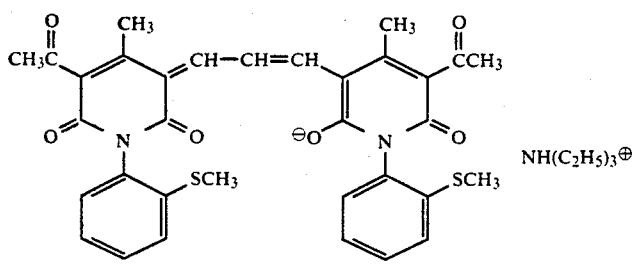
I-20
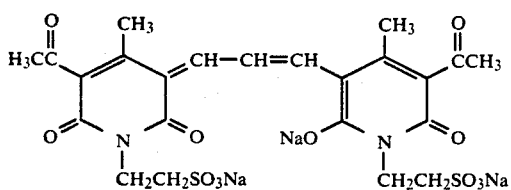
I-21
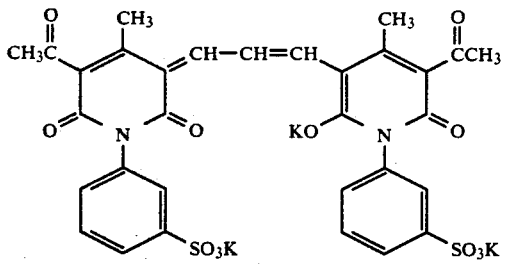
I-22
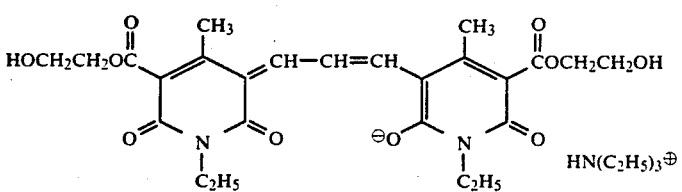

-continued
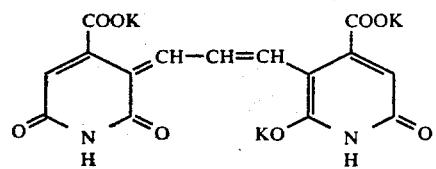
I-23
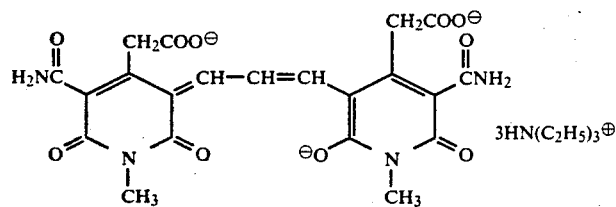
I-24
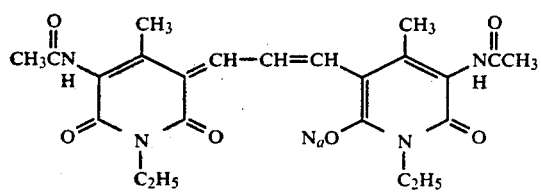
I-25
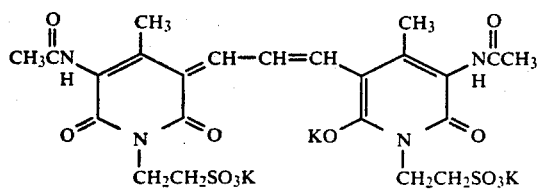
I-26
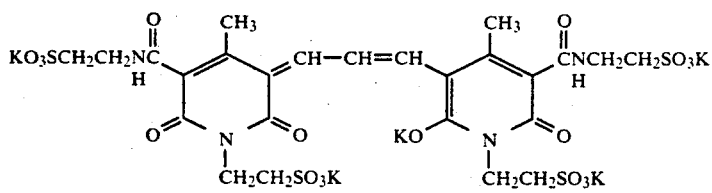
I-27
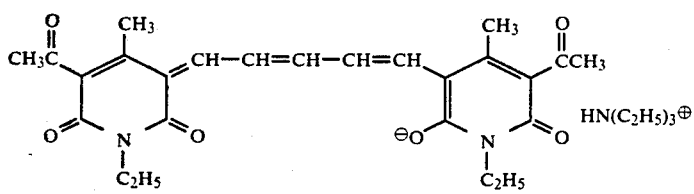
I-28
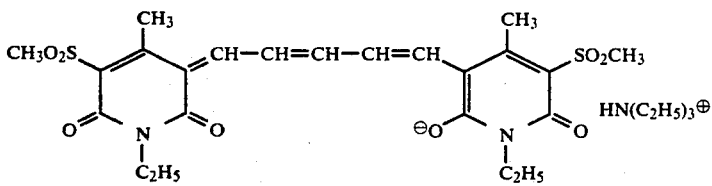
I-29
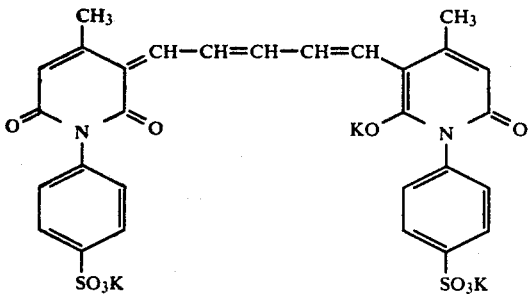
I-30

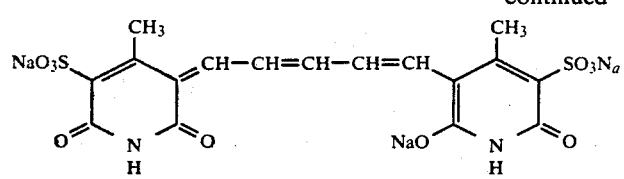
I-31
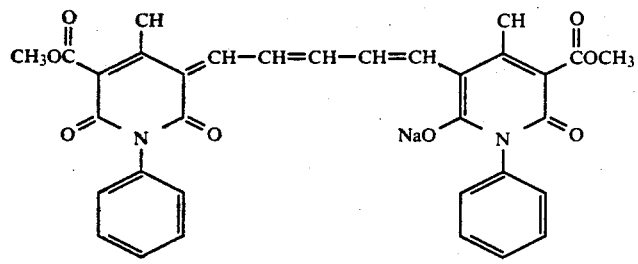
I-32
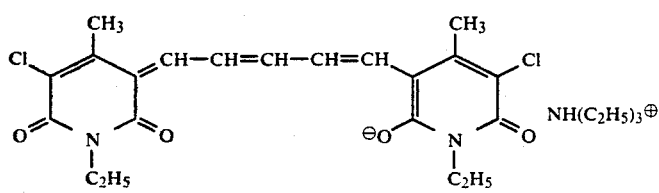
I-33
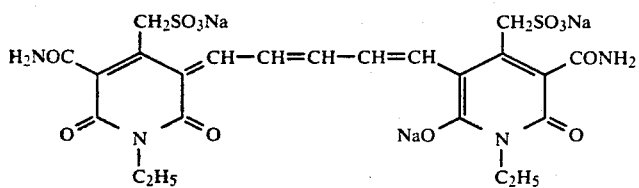
I-34
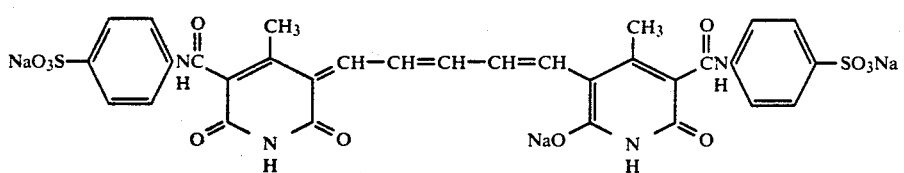
I-35
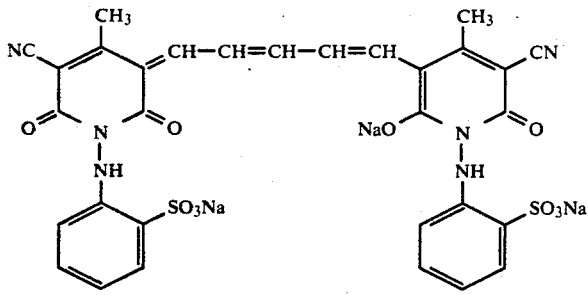
I-36
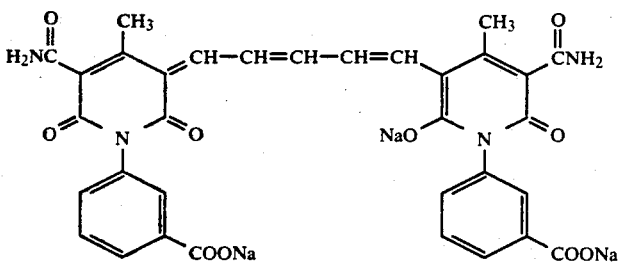
I-37

-continued
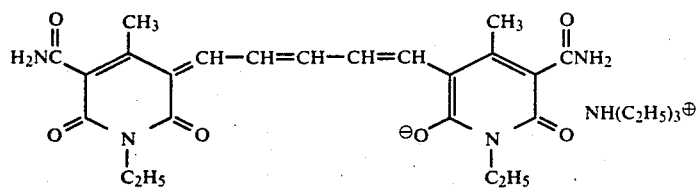 I-38
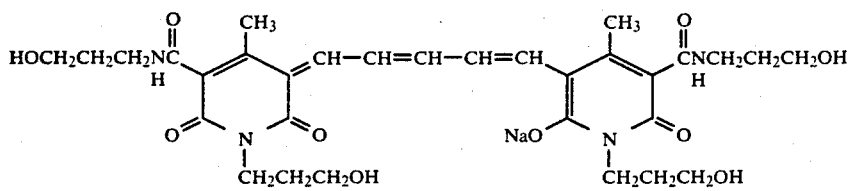 I-39
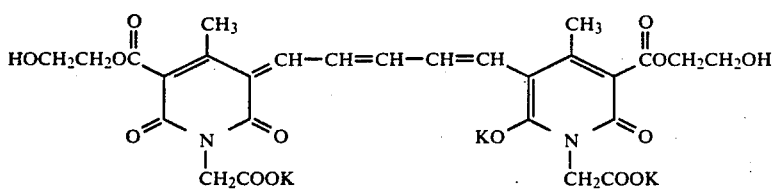 I-40
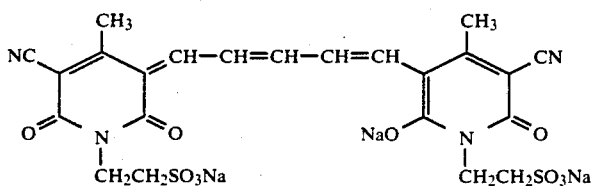 I-41
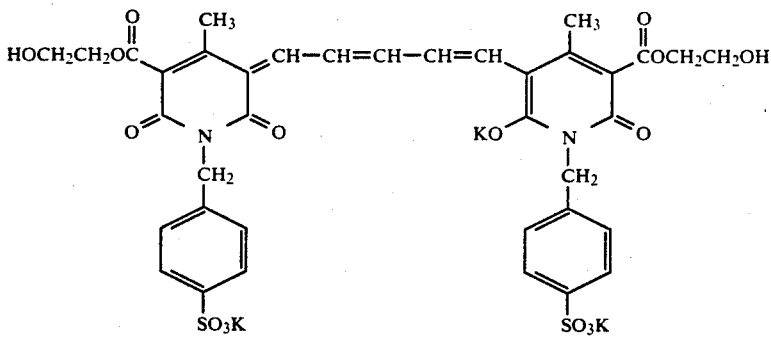 I-42
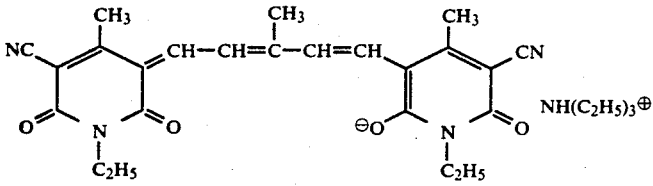 I-43
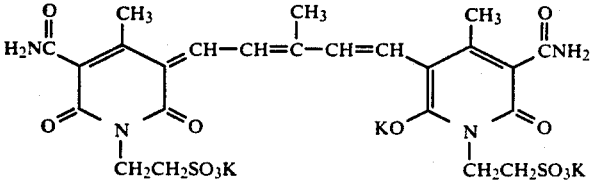 I-44

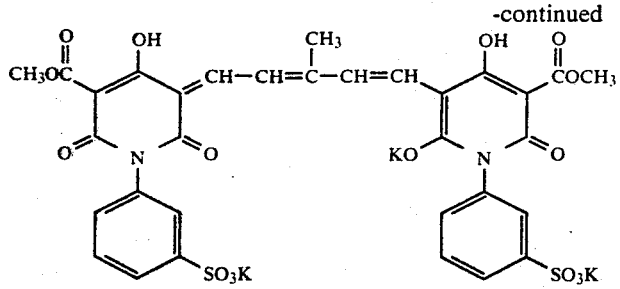

I-45

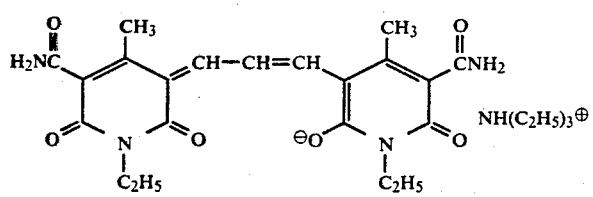

I-46

The dyes represented by general formula (I) can be synthesized using methods disclosed in U.S. Pat. Nos. 1,278,621, 1,512,863 and 1,579,899. The hydroxypyridones used to synthesize the dyes represented by general formula (I) can be synthesized using the methods disclosed in, for example, *Heterocyclic Compounds - Pyridine and Its Derivatives*, Part 3, Klingsberg Ed. (Interscience Publishing, 1962), *Journal of the American Chemical Society*, p. 449, Vol. 65, 1943, *Journal of Chemical Technology and Biotechnology*, p. 410, Vol. 36, 1986, *Tetrahedron*, p. 445, Vol. 22, 1966, JP-B-61-52827 (the term "JP-B" as used herein refers to an "examined Japanese patent publication"), West German Patents 2,162,612, 2,349,709 and 2,902,486 and U.S. Pat. No. 3,763,170.

Specific examples of the preparation of the dyes represented by general formula (I) are described below with respect to Dyes I-4, I-15, and I-37.

Preparation of Dye I-4

A mixture consisting of 32.5 g of 3-carbamoyl-1-carboxymethyl-6-hydroxy-4-methylpyrid-2-one, 22.2 g of potassium acetate, 9.5 g of 1,3,3-trimethoxypropane and 300 ml of ethanol was heated under reflux for a period of 3 hours and then cooled to room temperature. The precipitate which formed was recovered by filtration, washed with methanol and dried, whereupon 17.7 g of Dye I-4 was obtained.

Melting point, above 300° C.
$\lambda_{max}^{H_2O}$: 586 nm

Preparation of Dye I-15

A mixture consisting of 10.0 g of 3-cyano-6-hydroxy-4-methyl-1-(2-sulfoethyl)pyrid-2-one, 7.7 g of potassium acetate, 2.6 g of 1,3,3-trimethoxypropene, and 100 ml of acetic acid was stirred at 70° C. for a period of 5 hours. The precipitate which formed was recovered by filtration, dissolved in 350 ml of distilled water and 350 ml of methanol was added. The precipitate was recovered by filtration, washed with methanol and dried, whereupon 7.7 g of Dye I-15 was obtained.

Melting point, above 300° C.
$\lambda_{max}^{H_2O}$: 590 nm

Preparation of Dye I-37

Acetic anhydride (4.5 ml) was added to a mixture consisting of 5.4 g of 3-carbamoyl-1-(3-carboxyphenyl)-6-hydroxy-4-methylpyrid-2-one, 2.4 g of pentadienedianil hydrochloride, 7.1 ml of triethylamine and 50 ml of methanol and the mixture was stirred at room temperature for a period of 18 hours. Next, 150 ml of ethanol in which 4.7 g of sodium acetate had been dissolved was added, the precipitate which formed was recovered by filtration, washed with methanol and dried, whereupon 2.4 g of Dye I-37 was obtained.

Melting point, above 300° C.
$\lambda_{max}^{H_2O}$: 684 nm

The pyrazoloazole type couplers represented by general formula (II) are explained in detail below.

In general formula (II), the term "oligomer" signifies a substance having two or more groups which can be represented by general formula (II) in the same molecule; dimer and polymer couplers also being included. Here, the polymer couplers may be homopolymers formed from monomers having a moiety represented by general formula (II) (preferably a substance having a vinyl group, called a vinyl monomer below), or may be copolymers of non-color-forming ethylenic monomers which do not couple with the oxidized forms of primary aromatic amine developing agents.

Of the pyrazoloazole type couplers represented by general formula (II), preferred examples are those represented by the following general formulae (IIa), (IIb), (IIc), (IId) and (IIe).

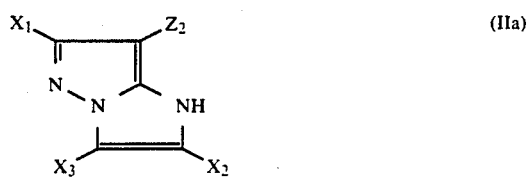

(IIa)

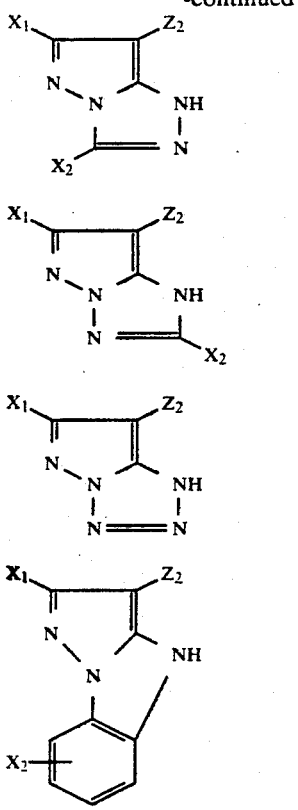

Of the couplers represented by general formulae (IIa) to (IIe), those represented by general formulae (IIa), (IIb) and (IIc) are preferred, and those represented by general formula (IIc) are more preferred for the purposes of this invention.

In general formulae (IIa) to (IIe), $X_1$, $X_2$ and $X_3$ may be the same or different and each represents a hydrogen atom, a halogen atom, an alkyl group having preferably 1 to 20 carbon atoms, an aryl group having preferably 6 to 10 carbon atoms, a heterocyclic group, a cyano group, an alkoxy group, an aryloxy group, a heterocyclic oxy group, an acyloxy group, a carbamoyloxy group, a silyloxy group, a sulfonyloxy group, an acylamino group, an anilino group, a ureido group, an imido group, a sulfamoylamino group, a carbamoylamino group, an alkylthio group, an arylthio group, a heterocyclic thio group, an alkoxycarbonylamino group, an aryloxycarbonylamino group, a sulfonamido group, a carbamoyl group, an acyl group, a sulfamoyl group, a sulfonyl group, a sulfinyl group, an alkoxycarbonyl group, and an aryloxycarbonyl group, and these groups are mentioned with the understanding that they can also include those which have been substituted with further substituent groups. The same is true below. $Z_2$ represents a hydrogen atom; a halogen atom; a carboxyl group; or a group which bonds with the carbon in the coupling position via an oxygen atom, a nitrogen atom or a sulfur atom and is released upon coupling. $X_1$, $X_2$, $X_3$, and $Z_2$ are divalent groups and may form dimers.

Furthermore, the coupling residual groups represented by general formulae (IIa) to (IIe) may form polymer couplers which are present in the main chain or side chains of the polymer and are particularly preferably polymers derived from vinyl monomers having moieties represented by general formulae (IIa) to (IIe), in which case, $X_1$, $X_2$, $X_3$ and $Z_2$ represent vinyl groups or linking groups.

More specifically, $X_1$, $X_2$ and $X_3$ each represents a hydrogen atom, a halogen atom (for example, chlorine, bromine), an alkyl group (for example, methyl, propyl, isopropyl, t-butyl, trifluoromethyl, tridecyl, 3-(2,4-di-t-amylphenoxy)propyl, 2-(2-octyloxy-5-tertoctylbenzenesulfonamido)ethyl, allyl, 2-dodecyloxyethyl, 3-phenoxypropyl, 2-hexylsulfonylethyl, cyclopentyl, benzyl), an aryl group (for example, phenyl, 4-t-butylphenyl, 2,4-di-t-amylphenyl, 4-tetradecanamidophenyl), a heterocyclic group (for example, 2-furyl, 2-thienyl, 2-pyrimidinyl, 2-benzothiazolyl), a cyano group, an alkoxy group (for example, methoxy, ethoxy, 2-methoxyethoxy, isopropoxy, 2-dodecyloxyethoxy, 2-phenoxyethoxy, 2-methanesulfonylethoxy), an aryloxy group (for example, phenoxy, 2-methylphenoxy, 2-methoxyphenoxy, 4-t-butylphenoxy), a heterocyclic oxy group (for example, 2-benzimidazolyloxy), an acyloxy group (for example, acetoxy, hexadecanoyloxy), a carbamoyloxy group (for example, N-phenylcarbamoyloxy, N-ethylcarbamoyloxy), a silyloxy group (for example, trimethylsilyloxy), a sulfonyloxy group (for example, dodecylsulfonyloxy), an acylamino group (for example, acetamido, benzamido, tetradecanamido, α-(2,4-di-t-amylphenoxy)butyramido, γ-(3-t-butyl-4-hydroxyphenoxy)butyramido, α-[4-(4-hydroxyphenylsulfonyl)phenoxy]decanamido), an anilino group (for example, phenylamino, 2-chloroanilino, 2-chloro-5-tetradecanamidoanilino, 2-chloro-5-dodecyloxycarbonylanilino, N-acetylanilino, 2-chloro-5-[α-(3-t-butyl-4-hydroxyphenoxy)dodecanamido]anilino), a ureido group (for example, phenylureido, methylureido, N,N-dibutylureido), an imido group (for example, N-succinimido, 3-benzylhydantoinyl, 4-(2-ethylhexanoylamino)phthalimido), a sulfamoylamino group (for example, N,N-dipropylsulfamoylamino, N-methyl-N-decylsulfamoylamino), an alkylthio group (for example, methylthio, octylthio, tetradecylthio, 2-phenoxyethylthio, 3-phenoxypropylthio, 3-(4-t-butylphenoxy)propylthio), an arylthio group (for example, phenylthio, 2-butoxy-5-t-octylphenylthio, 3-pentadecylphenylthio, 2-carboxyphenylthio, 4-tetradecanamidophenylthio), a heterocyclic thio group (for example, 2-benzothiazolylthio), an alkoxycarbonylamino group (for example, methoxycarbonylamino, tetradecyl.oxycarbonylamino), an aryloxycarbonylamino group (for example, phenoxycarbonylamino, 2,4-di-tert-butylphenoxycarbonylamino), a sulfonamido group (for example, methanesulfonamido, hexadecanesulfonamido, benzenesulfonamido, p-toluenesulfonamido, octadecanesulfonamido, 2-butyloxy-5-t-butylbenzenesulfonamido), a carbamoyl group (for example, N-ethylcarbamoyl, N,N-dibutylcarbamoyl, N-(2-dodecyloxyethyl)carbamoyl, N-methyl-N-dodecylcarbamoyl, N-[3-(2,4-di-tert-amylphenoxy)propyl]carbamoyl), an acyl group (for example, acetyl, (2,4-di-tert-amylphenoxy)acetyl, benzoyl), a sulfamoyl group (for example, N-ethylsulfamoyl, N,N-dipropylsulfamoyl, N-(2-dodecyloxyethyl)sulfamoyl, N-ethyl-N-dodecylsulfamoyl, N,N-diethylsulfamoyl), a sulfonyl group (for example, methanesulfonyl, octanesulfonyl, benzenesulfonyl, toluenesulfonyl), a sulfinyl group (for example, octanesulfinyl, dodecylsulfinyl, phenylsulfinyl), an alkoxycarbonyl group (for example, methoxycarbonyl, butyloxycarbonyl, dodecylcarbonyl, octadecylcarbonyl), and an aryloxycarbonyl group (for example, phenyloxycarbonyl, 3-pentadecyloxycarbonyl); $Z_2$ represents a hydrogen atom, a halogen atom (for example, chlorine, bromine, iodine), a carboxyl group, or a group which is linked through an oxygen atom (for example, acetoxypropanoyloxy, benzoyloxy, 2,4-dichlorobenzoyloxy, ethoxyoxaloyloxy, pyruvinyloxy, cinnamoyloxy, phenoxy, 4-cyanophenoxy, 4-methanesulfonamidophenox,, 4-methanesulfonylphenoxy, α-naphthoxy, 3-pentadecylphenoxy, benzyloxycarbonyloxy, ethoxy group, 2-cyanoethoxy, benzyloxy, 2-phenethyloxy, 2-phenoxyethoxyhydantoinyl, 5-methyl-1-tetrazolyl), an arylazo group (for example, 4-methoxyphenylazo, 4-pivaloylaminophenylazo, 2-naphthylazo, 3-methyl-4-hydroxyphenylazo), groups which are linked through a sulfur atom (for example, phenylthio, 2-carboxyphenylthio, 2-methoxy-5-t-octylphenylthio, 4-methanesulfonylphenylthio, 4-octanesulfonamidophenylthio, 2-butoxyphenylthio, 2-(2-hexanesulfonylethyl)-5-tert-octylphenylthio, benzylthio, 2-cyanoethylthio, 1-ethoxycarbonyltridecylthio, 5-phenyl-2,3,4,5-tetrazolylthio, 2-benzothiazolylthio, 2-dodecylthio-5-thiophenylthio, 2-phenyl-3-dodecyl-1,2,4-triazolyl-5-thio).

In the couplers of general formula (IIa), $X_2$ and $X_3$ may combine to form a 5- to 7-membered ring.

When $X_1$, $X_2$, $X_3$ or $Z_2$ are two groups and form dimers, $X_1$, $X_2$ and $X_3$ are preferably substituted or unsubstituted alkylene groups (for example, methylene, ethylene, 1,10-decylene, —CH₂CH₂—O—CH₂CH₂—), substituted or unsubstituted phenylene groups (for example, 1,4-phenylene, 1,3-phenylene,

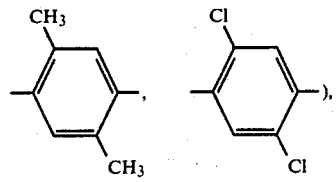

an —NHCO—$X_4$—CONH—group ($X_4$ represents a substituted or unsubstituted alkylene group or phenylene group, for example —CHCOCH₂CH₂CONH—,

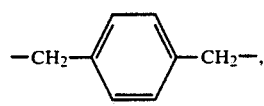

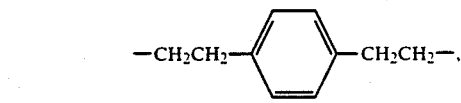

an —S—$X_4$—S—group ($X_4$ represents a substituted or unsubstituted alkylene group, for example —S—CH₂CH₂—S—,

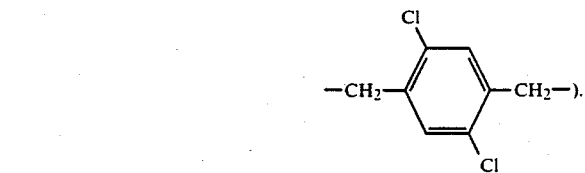

Divalent groups for $Z_2$ include the univalent groups described for $Z_2$ previously made into divalent groups where suitable.

The linking groups represented by $X_1$, $X_2$, $X_3$ or $Z_2$, when a substance represented by general formulae (IIa), (IIb), (IIc), (IId) and (IIe) is contained in a vinyl monomer, include groups formed by combinations of substances selected from alkylene groups (substituted or unsubstituted alkylene groups, for example, methylene, ethylene, 1,10-decyl, —CH₂CH₂OCH₂CH₂—), phenylene groups (substituted or unsubstituted phenylene groups, for example, 1,4-phenylene, 1,3-phenylene,

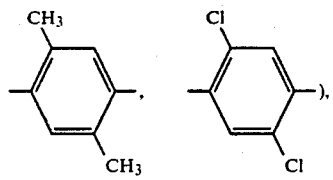

—NHCO—, —CONH—, —O—, —OCO—and aralkylene groups (for example,

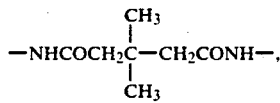

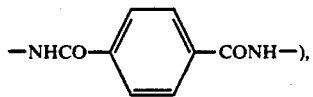

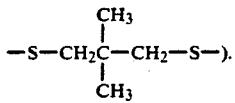

Preferred linking groups are given below.

—NHCO—,

—CH₂CH₂—,

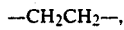

—CH₂CH₂NHCO—,

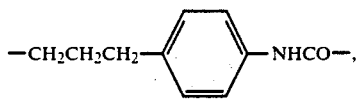

—CONH—CH₂CH₂NHCO—,

—CH₂CH₂O—CH₂CH₂—NHCO—,

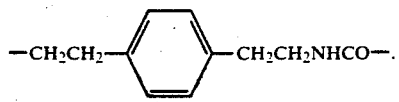

Moreover, apart from the substances represented by general formulae (IIa), (IIb), (IIc), (IId) or (IIe), the vinyl group may also have substituent groups, the preferred substituent groups being chlorine atoms and lower alkyl groups with from 1 to 4 carbon atoms (for example, methyl, ethyl).

The monomers containing substances represented by general formulae (IIa), (IIb), (IIc), (IId) and (IIe) may form copolymers with non-color-forming ethylenic monomers which do not couple with the oxidation products of primary aromatic amine developing agents.

Non-color-forming ethylenic monomers which do not couple with the oxidation products of primary aromatic amine developing agents include acrylic acid, α-chloroacrylic acid, α-alkylacrylic acids (for example, methacrylic acid), and esters or amides of these acrylic acids (for example, acrylamide, n-butylacrylamide, t-butylacrylamide, diacetoneacrylamide, methacrylamide, methyl acrylate, ethyl acrylate, n-propyl acrylate, n-butyl acrylate, t-butyl acrylate, isobutyl acrylate, 2-ethylhexyl acrylate, n-octyl acrylate, lauryl acrylate, methyl methacrylate, ethyl methacrylate, n-butyl methacrylate and α-hydroxy methacrylate), methylenebisacrylamide, vinyl esters (for example, vinyl acetate, vinyl propionate and vinyl laurate), acrylonitrile, methacrylonitrile, aromatic vinyl compounds (for example, styrene and derivatives thereof, vinyltoluene, divinylbenzene, vinylacetophenone and sulfostyrene), itaconic acid, citraconic acid, crotonic acid, vinylidene chloride, vinyl alkyl ethers (for example, vinyl ethyl ether), maleic acid, maleic anhydride, maleic acid esters, N-vinyl-2-pyrrolidone, N-vinylpyridine and 2- and 4-vinylpyridine and the like. Two or more types of non-color-forming unsaturated ethylenic monomers used here can be used together. Examples include n-butyl acrylate and methyl acrylate, styrene and methacrylic acid, methacrylic acid and acrylamide, methyl acrylate and diacetoneacrylamide and the like.

The non-color-forming unsaturated ethylenic monomer which is copolymerized with the solid water-insoluble monomer coupler can be chosen so as to impart beneficial effects to the physical properties and/or the chemical properties of the copolymer which is formed in a way which is commonly known in the field of polymer color couplers; for example, the solubility, compatibility with the binder for the photographic colloid composition (for example, gelatin), plasticity, heat stability and the like.

The polymer couplers which are used in this invention may be water-soluble or water-insoluble substances although, of these, polymer coupler latexes are particularly preferred.

These couplers can be synthesized using methods disclosed in, for example, JP-A-59-171956, JP-A-60-172982, JP-A-60-190779, JP-A-60-197688, JP-A-60-215687.

Coupler structures used in this invention are shown below, but the invention is not to be construed as being limited to these.

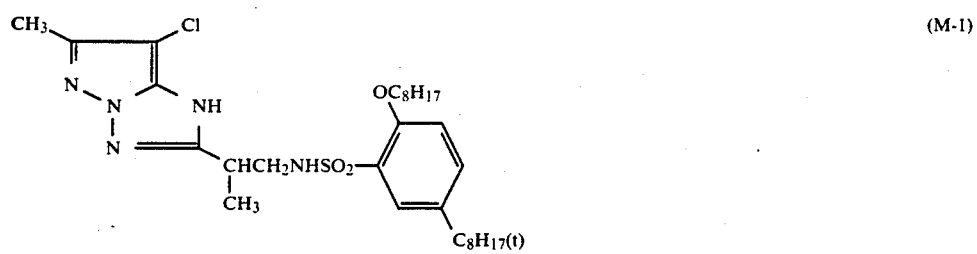

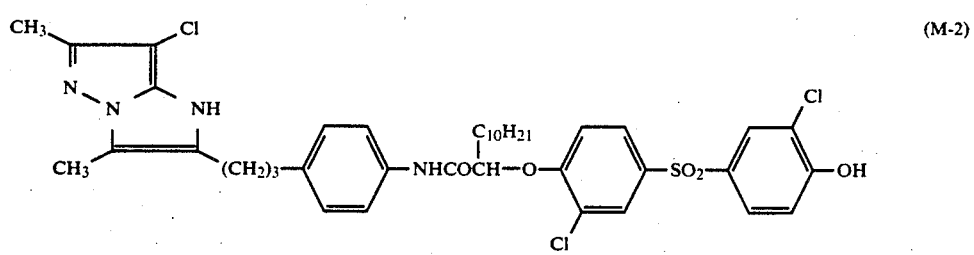

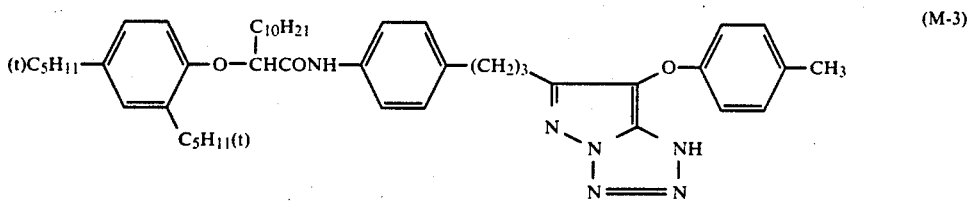

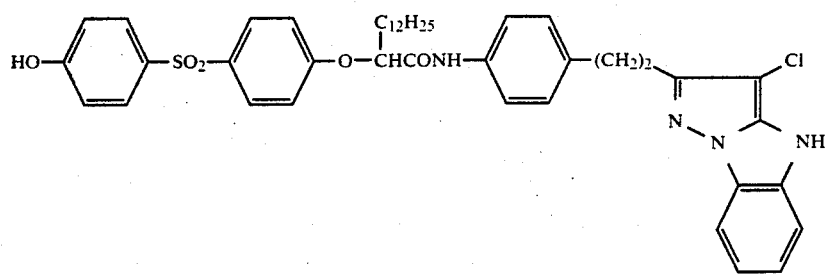
(M-4)
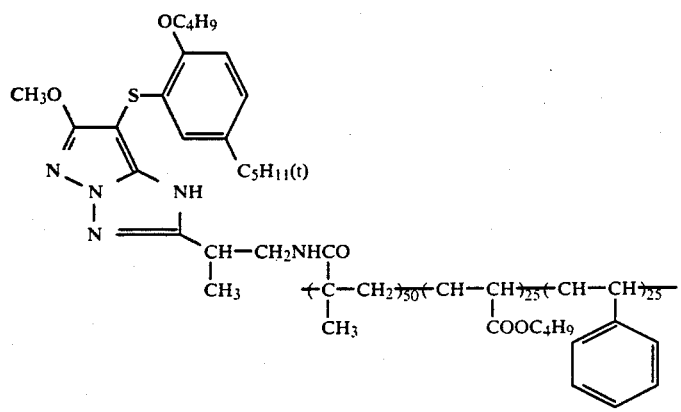
(M-5)
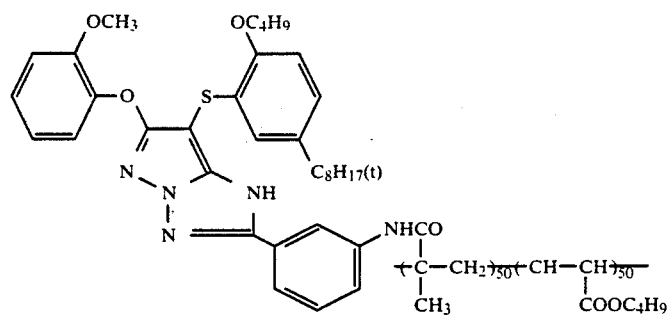
(M-6)
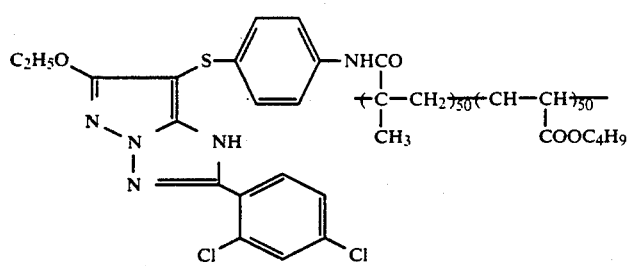
(M-7)
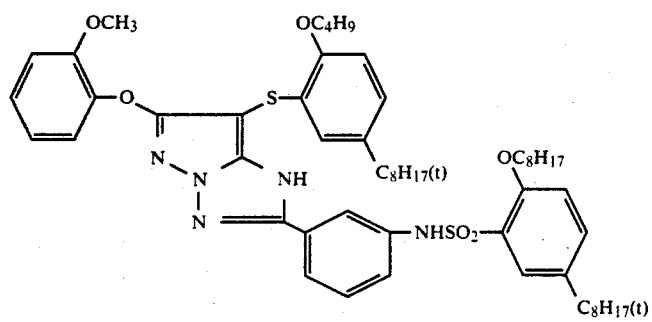
(M-8)

-continued
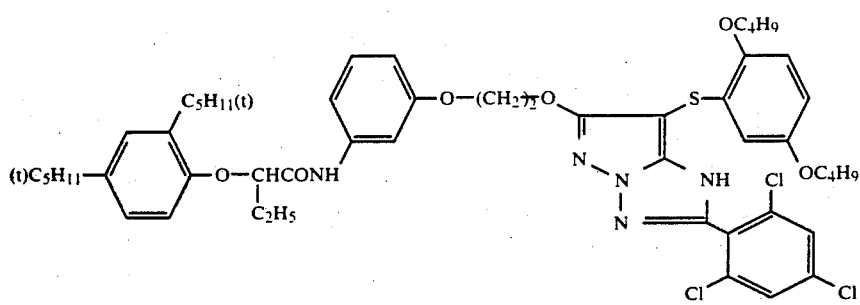 (M-9)
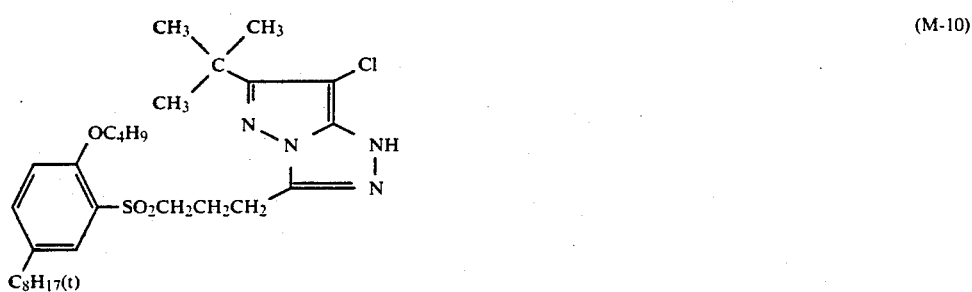 (M-10)
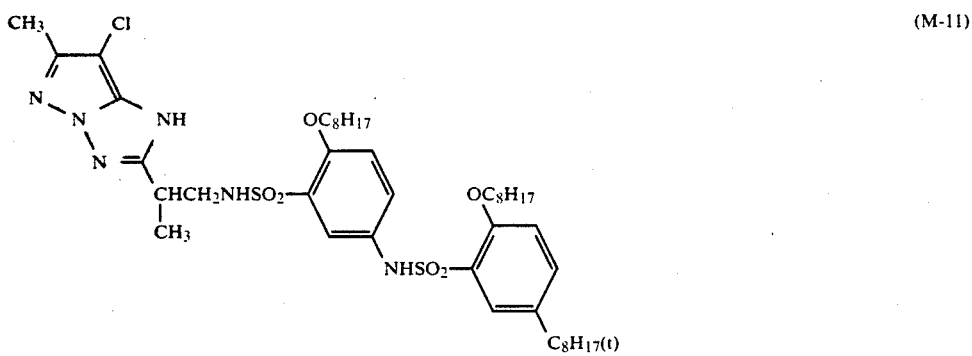 (M-11)
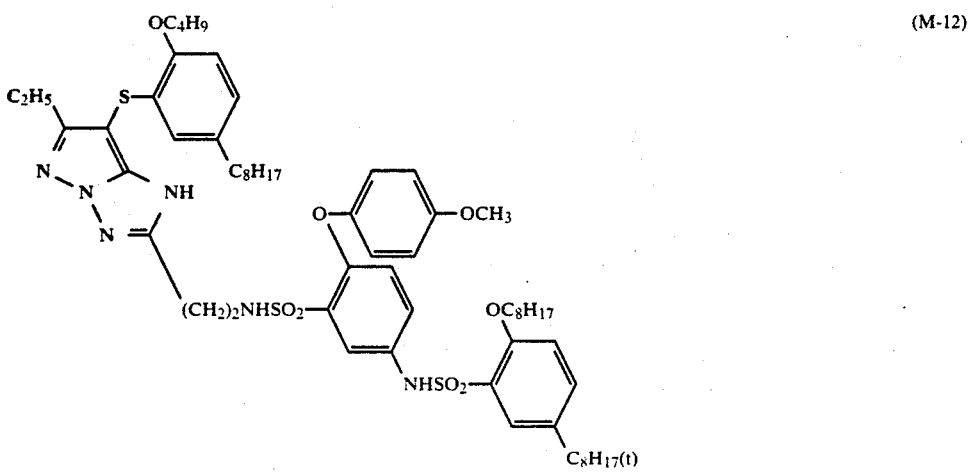 (M-12)

-continued
(M-13)
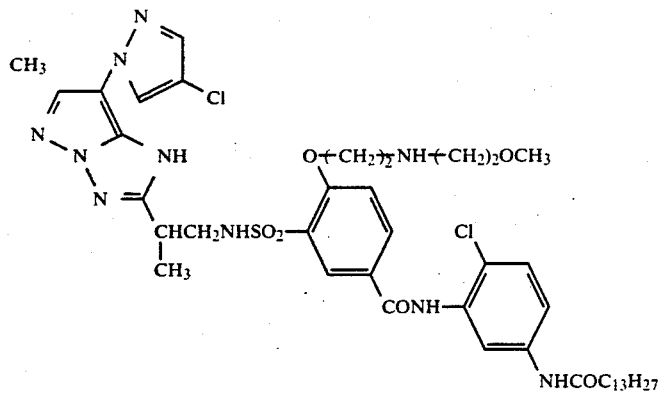
(M-14)
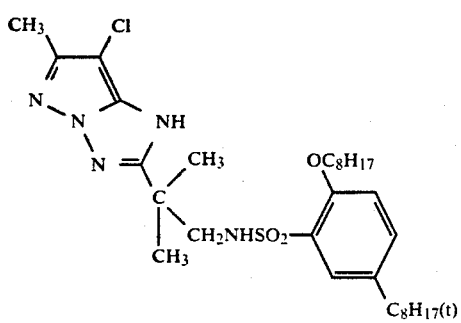
(M-15)
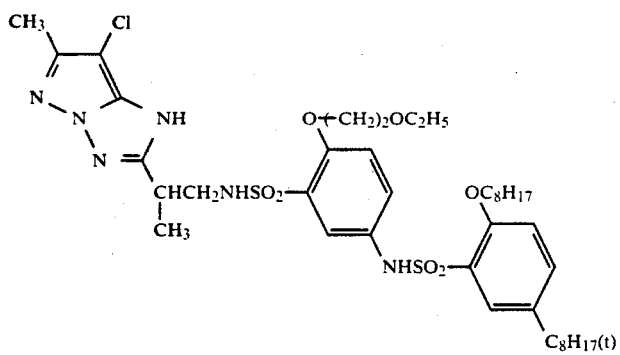
(M-16)
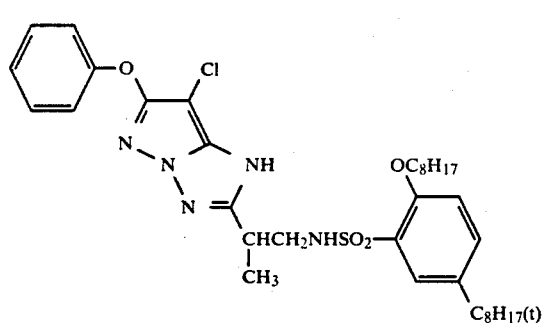
(M-17)
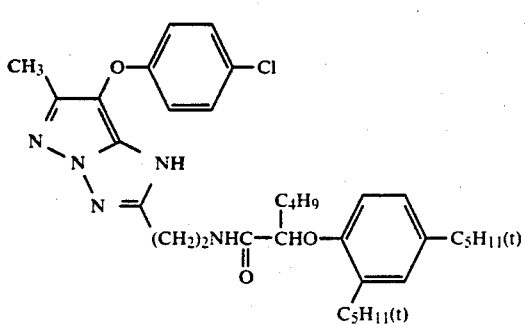

-continued
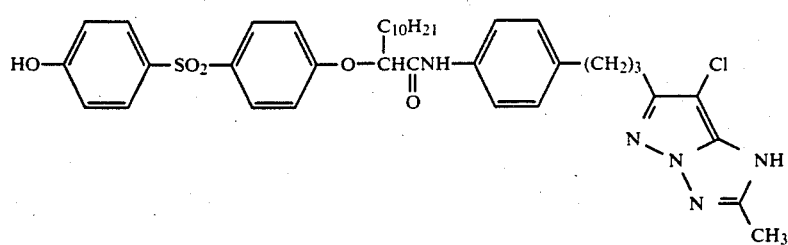
(M-18)
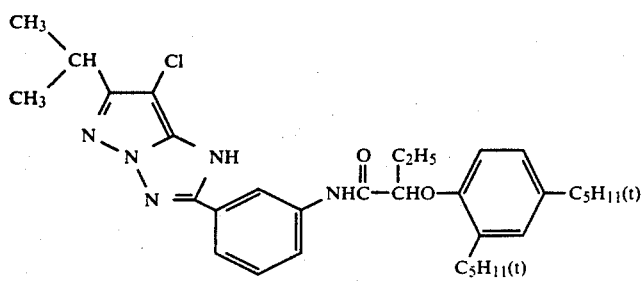
(M-19)
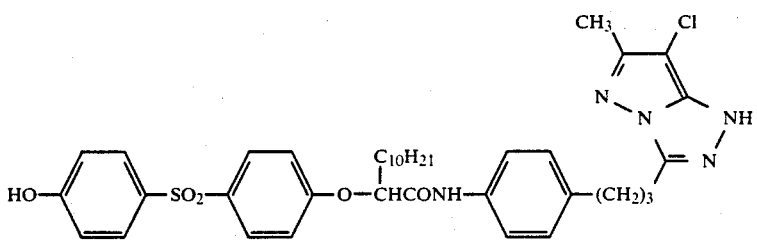
(M-20)
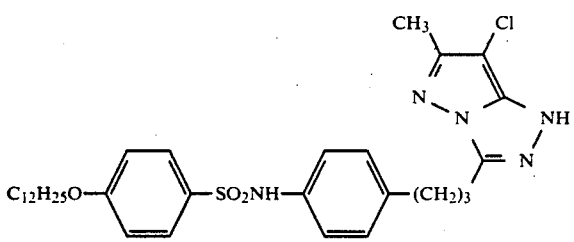
(M-21)
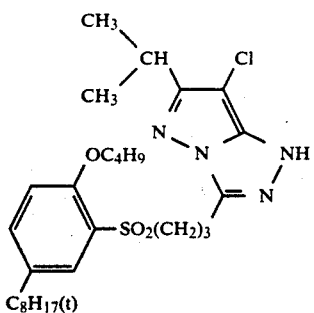
(M-22)
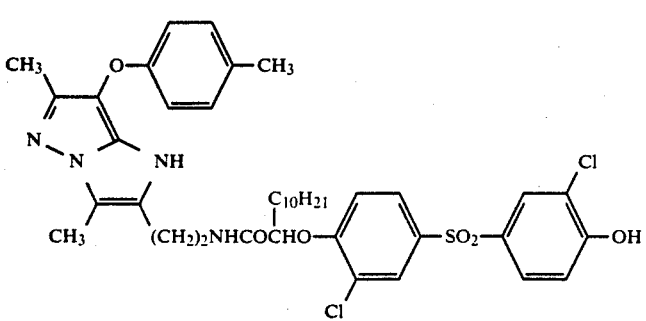
(M-23)

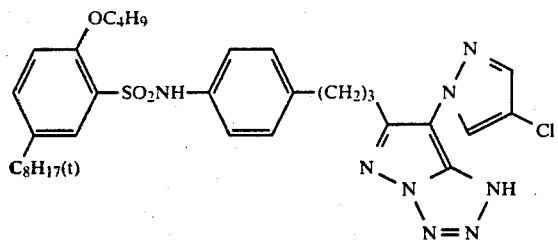
(M-24)
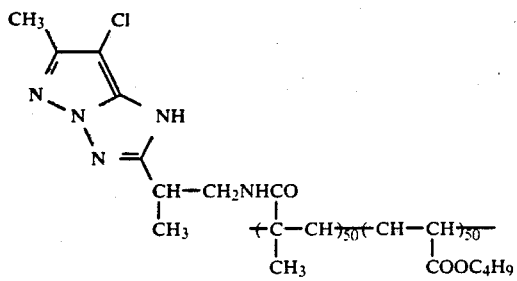
(M-25)
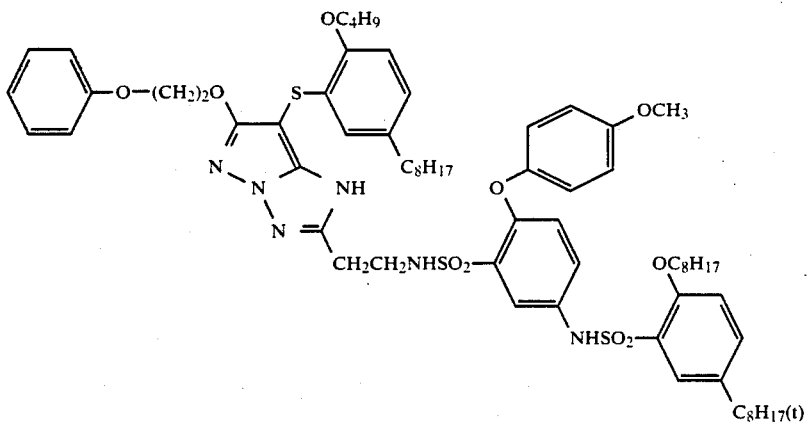
(M-26)
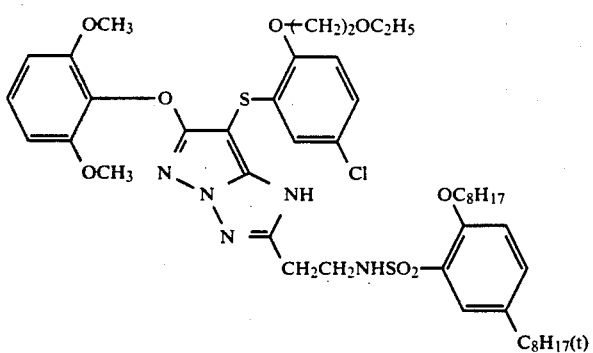
(M-27)
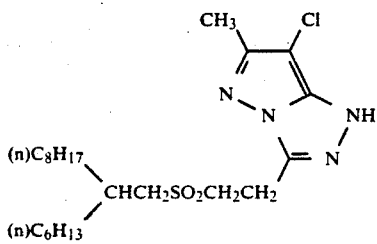
(M-28)

(M-29)

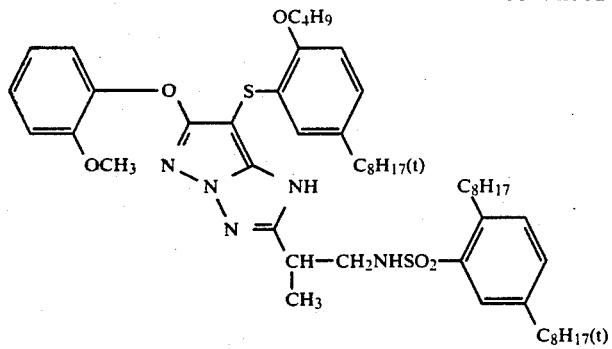

When the dyes represented by general formula (I) are used as filter dyes, antiirradiation dyes or antihalation dyes, they may be used in any effective amount desired although it is preferred that they are used so that an optical density is within the range of from 0.05 to 3.0. The dyes represented by general formula (I) are used in an amount of from 1 to 1,000 mg/m², preferably from 1 to 250 mg/m². They can be added at any point before coating. The dyes of this invention can be dispersed using various known methods in the emulsion layers and other hydrophilic colloid layers (intermediate layers, protective layer, antihalation layer, filter layers and the like).

(1) Methods in which the dyes of this invention are directly dissolved or dispersed in the emulsion layers and hydrophilic colloid layers or methods in which they are used in the emulsion layers and hydrophilic colloid layers after dissolution or dispersion in an aqueous solution or solvent.

They can be added to the emulsion in the form of a solution after dissolution in a suitable solvent, for example, methyl alcohol, ethyl alcohol, propyl alcohol, methyl Cellosolve, the alcohol halides disclosed in JP-A-48-9715 and U.S. Pat. No. 3,756,830, acetone, water, pyridine and the like or in solvent mixtures of these.

(2) Methods in which the dye is localized in a specific layer by the interaction with dye molecules arising when a hydrophilic polymer having an opposite charge to that of the dye ions is also present as a mordant in a layer.

Polymer mordants are polymers containing quaternary cationic groups of polymers having nitrogen-containing heterocyclic ring portions; polymers containing secondary and tertiary amino groups, and have . molecular weights of 5,000 or more, particularly preferably of 10,000 or more.

Examples include the vinylpyridine polymers and vinylpyridinium cation polymers disclosed, for example, in the specification of U.S. Pat. No. 2,548,564; the vinylimidazolium cation polymers disclosed, for example, in the specification of U.S. Pat. No. 4,124,386; the polymer mordants, which are capable of crosslinking with gelatin and the like, disclosed, for example, in U.S. Pat. No. 3,625,694; the aqueous sol type mordants disclosed, for example, in the specifications of U.S. Pat. No. 3,958,995 and JP-A-54-115228; the water-insoluble mordants disclosed in the specification of U.S. Pat. No. 3,898,088; the reactive mordants which are able to bond covalently with dyes disclosed in, for example, the specification of U.S. Pat. No. 4,168,976; the polymers derived from unsaturated ethylene compounds having a dialkylaminoalkyl ester residual group disclosed in G.B. Patent 685,475; the products obtained by reacting polyvinyl alkyl ketones and aminoguanidine as disclosed in G.B. Patent 850,281; and the polymers derived from 2-methyl-1-vinylimidazole disclosed in U.S. Pat. No. 3,445,231.

(3) Methods in which the compounds are dissolved using surfactants.

Useful surfactants can be oligomers or polymers. Details of these polymeric substances are disclosed on pages 19 to 27 of the specification of JP-A-60-158437.

Furthermore, hydrosols of lipophilic polymers disclosed, for example, in JP-B-51-39835 may be added to the hydrophilic colloid dispersions obtained above.

The couplers represented by general formula (II) can be used by dissolution in an organic solvent with a high boiling point (for example, based on phthalic acid esters, phosphoric acid esters, aliphatic acid esters and the like) and then dispersed in a hydrophilic colloid medium. The couplers of general formula (II) are used in an amount of preferably from 0.01 to 1.0 g/m², more preferably from 0.05 to 0.7 g/m².

Gelatin is representative of hydrophilic colloids, but other hydrophilic colloids which are conventionally known to be usable photographically can also be used.

Silver bromide, silver iodobromide, silver iodochlorobromide, silver chlorobromide and silver chloride are preferred for the silver halide emulsions which are used in this invention.

The silver halide grains which are used in this invention are those having a regular crystal form such as a cubic or octagonal form, an irregular crystal form such as a spherical or tabular form, or alternatively a complex shape of these crystal forms. Furthermore, mixtures of grains of various crystal forms can also be used although it is preferable to use regular crystal forms.

The silver halide crystal grains used in this invention may be formed as uniform layers or as disparate layers where the inside and tee surface layers are different. Furthermore, they may be grains of the type where the latent image is formed mainly on the surface (for example, negative emulsions) or they may be grains of the type where it is formed mainly inside the grains (for example, internal latent image type emulsions and prefogged direct reversal type emulsions).

The silver halide emulsions used in this invention are preferably tabular grain emulsions where grains with a thickness of 0.5 μm or less and preferably 0.3 μm or less, a diameter of 0.6 μm or less and an average aspect ratio of 5 or more occupy 50% or more of the total projected surface area, or monodispersed emulsions where the statistical variation coefficient (the value for the standard deviation S of the distribution expressed by the diameter divided by the diameter d when the projected surface area is taken as an approximate circle: S/d̄) is 20% or less. In addition, two or more kinds of tabular grain emulsions and monodispersed emulsions may be mixed.

The photographic emulsions used in this invention can be prepared using the methods disclosed in P. Glafkides, *Chimie et Physique Photographique* (Paul Montel, 1967); G. F. Duffin, *Photographic Emulsion Chemistry* (Focal Press, 1966); V. L. Zelikman, *Making and Coating Photographic Emulsions* (Focal Press, 1964) and elsewhere.

In order to control the growth of the silver halide grains during grain formation, it is possible to use, for example, ammonia, potassium thiocyanate, ammonium thiocyanate, thioether compounds (for example, in U.S. Pat. Nos. 3,271,157, 3,574,628, 3,704,130, 4,297,439, 4,276,374), thione compounds (for example, in JP-A-53-144319, JP-A-53-82408, JP-A-55-77737), amine compounds (for example, in JP-A-54-100717).

Cadmium salts, zinc salts, thallium salts, iridium salts and complex salts thereof, rhodium salts and complex salts thereof, iron salts and complex salts thereof and similar salts and complexes may be present together during the process of silver halide grain formation or physical ripening.

The silver halide emulsions are normally chemically sensitized. It is possible to use, for chemical sensitization, the methods disclosed in, for example, pages 675 to 734 of H. Frieser, *Die Grundlagen der Photographischen Prozesse mit Silberhalogeniden (Principles of Photographic Processes with Silver Halide)* (Akademische Verlagsgesellschaft, 1968).

In other words, it is possible to use, either alone or in combination: a sulfur sensitization method which uses compounds containing sulfur reactive with active gelatin and silver (for example, thiosulfate salts, thioureas, mercapto compounds, rhodanines); reduction sensitization which uses reducing substances (for example, stannous salts, amines, hydrazine derivatives, formamidinesulfinic acid and silane compounds); precious metal sensitization methods which use precious metals (for example, in addition to gold complexes, complexes of precious metals of Group VIII of the Periodic Table such as Pt, Ir, Pd) and similar processes.

Various compounds can be present in the silver halide photographic emulsions used in this invention in order to prevent fogging or to stabilize the photographic properties during the production, storage or photographic processing of the photosensitive materials. In other words, it is possible to add many compounds which are known as antifogging agents and stabilizers such as: azoles, for example, benzothiazolium salts, nitroindazoles, triazoles, benzotriazoles, benzimidazoles (nitro- or halogen-substituted benzimidazoles in particular); heterocyclic mercapto compounds, for example, mercaptothiazoles, mercaptobenzothiazoles, mercaptobenzimidazoles, mercaptothiadiazoles, mercaptotetrazoles (1-phenyl-5-mercaptotetrazole in particular), mercaptopyrimidines; the above-mentioned heterocyclic mercapto compounds having water-soluble groups such as carboxyl groups and sulfone groups; thioketo compounds, for example, oxazolinethione; azaindenes, for example, tetraazaindenes (4-hydroxy-substituted (1,3,3a,7)tetraazaindenes in particular); benzenethiosulfonates; and benzenesulfinic acid.

The silver halide photographic emulsions of this invention may contain color couplers such as cyan couplers, magenta couplers and yellow couplers and compounds which can be used to disperse these couplers.

Specifically, they may contain compounds which are able to form colors by oxidative coupling with primary aromatic amine developing agents (for example, phenylenediamine derivatives and aminophenol derivatives during color development processing. Examples of magenta couplers include 5-pyrazolone couplers, pyrazolobenzimidazole couplers, cyanoacetylcoumarone couplers, pyrazolotriazole couplers, closed chain acylacetonitrile couplers and the like; examples of yellow couplers include acylacetamide couplers (for example, benzoylacetanilides and pivaloylacetanilides); and examples of cyan couplers include naphthol couplers and phenol couplers. Nondispersive couplers having hydrophobic groups known as ballast groups in their molecules are desirable for these couplers. The couplers may be either 4-equivalent or 2-equivalent with respect to silver ions. Furthermore, they may also be colored couplers which have a color correcting effect or couplers which release development inhibiting agents during development (so-called DIR couplers).

Apart from the DIR couplers, they may also include colorless DIR coupling compounds, the coupling reaction products of which are colorless and which release development inhibiting agents.

Furthermore, it is also possible to include ultraviolet absorbers and antifading agents which can be typified by cinnamic acid esters and 2-(2-hydroxyphenyl)benzotriazole.

These antifading agents include the compounds disclosed in, for example: U.S. Pat. Nos. 3,432,300, 3,573,045, 3,574,627, 3,700,455, 3,764,337, 3,935,016, 4,254,216, 4,268,593, 4,430,425, 4,465,757, 4,465,765 and 4,518,679, G.B. Patent 1,347,556, G.B. Laid-Open Patent 2,066,975, JP-A-52-152225, JP-A-53-17729, JP-A-53-20327, JP-A-54-145530, JP-A-55-6321, JP-A-55-21004, JP-A-61-72246, JP-A-61-73152, JP-A-61-90155, JP-A-61-90156 and JP-A-61-145554.

In order to enhance sensitivity, enhance contrast or to accelerate development, polyalkylene oxides or ethers, esters, amines and other such derivatives thereof, thioether compounds, thiomorpholines, quaternary ammonium salt compounds, urethane derivatives, urea derivatives, imidazole derivatives, 3-pyrazolidones and the like may, for example, be present in the photographic emulsions of this invention.

Known water-soluble dyes other than the dyes disclosed in this invention (for example, oxonol dyes; hemioxonol dyes and merocyanine dyes) may be used in combination in the silver halide photographic emulsions of this invention as filter dyes or for irradiation prevention and various other purposes. Furthermore, other than the dyes disclosed in this invention, known cyanine dyes, merocyanine dyes and hemicyanine dyes may be used in combination as spectral sensitizing agents.

Various surfactants may be present in the photographic emulsions of this invention as various agents such as coating assistants, antistatic agents, slip improvers, emulsifying and dispersing agents, antiadhesive agents and improvers of photographic properties (such as development acceleration, hardening, sensitization).

Furthermore, various additives to the photosensitive materials of this invention, antifading agents, film-hardening agents, anti-color-fogging agents, ultraviolet absorbers, protective colloids for gelatin, etc., are mentioned specifically in, for example, *Research Disclosure*, Vol. 176 (1978, XII), RD-17643.

The finished emulsions are coated onto suitable supports such as, baryta paper, resin-coated paper, synthetic paper, triacetate film, polyethylene terephthalate film as well as onto synthetic resin supports or glass plates.

The silver halide photographic materials of this invention include color positive films, color papers, color negative films, color reversal films and color reversal papers (those with couplers and those without them), autopositive color films and autopositive color papers, photographic materials for plate making (for example, lithographic films, lithoduplicating films, etc.), cathode ray tube display materials (for example, emulsion X-ray recording materials, materials for direct and indirect photography using screens), materials for the silver salt diffusion transfer process, materials for the color diffusion transfer process, materials used in the dye transfer process (imbibition transfer process), silver dye bleaching process, materials for recording printout images, direct print image materials, thermal development materials, physical development materials and the like.

Conventional methods may be used for the exposure to obtain a photographic image. Thus, it is possible to use the multitude of known light sources such as natural light (sunlight), tungsten lamps, fluorescent lighting, mercury lighting, xenon arc lighting, carbon arc lighting, xenon flash lighting and cathode ray tube flying spot. The exposure time is normally from 1/1,000 second to 30 seconds, but it is also possible to use an exposure shorter than 1/1,000 second, for example, an exposure of from $1/10^4$ to $1/10^6$ second using a xenon flash lamp or a cathode ray tube and it is also possible to use exposures longer than 30 seconds. If required, it is possible to adjust the spectral composition of the light used for the exposure using color filters. It is also possible to use laser light for the exposure. In addition, exposure may be carried out using the light emitted from fluorescent bodies excited by electron beams, X-rays, $\gamma$-rays, $\alpha$-rays and the like.

Any known methods and known processing solutions, for example, those disclosed on pages 28 to 30 of *Research Disclosure*, No. 176 (RD-17643), can be used as appropriate in the photographic processing of photosensitive materials produced using this invention. This photographic processing can be either photographic processing for the formation of a silver image (black-and-white photographic processing) or photographic processing for the formation of a dye image (color photographic processing) according to the objective. A processing temperature of between 18° and 50° C. is normally selected although the temperature may be lower than 18° C. or in excess of 50° C.

There are no particular limitations on the color photographic processing methods and various kinds of methods can be suitably employed. Representative examples of these are the method in which, following exposure, color development and bleach-fixing processing are carried out, and washing and stabilization processes are further carried out if required; the method in which, following exposure, color development and separate bleaching and fixing processes are carried out, and washing and stabilization processes are further carried out if required; the method in which, following exposure, a uniform exposure is provided with development in a development bath containing a black-and-white developing agent and then color development and bleach-fixing processing are carried out, and washing and stabilization processes are further carried out if required; or the method in which, following exposure, development is carried out with a development bath containing a black-and-white developing agent and then bleach-fixing processing is carried out following further development in a color development bath containing a fogging agent (for example, sodium hydrogen borate), and in which washing and stabilization processes are further carried out if required.

The primary aromatic amine color developing agents used in the color development baths of this invention can be known substances widely used in various color photographic processes. These developing agents include aminophenol-based and p-phenylenediamine-based derivatives. Preferred examples are p-phenylenediamine derivatives and representative examples are given below although the invention is not to be construed as being limited to these.

D -1 N,N-Diethyl-p-phenylenediamine
D- 2 2-Amino-5-diethylaminotoluene
D- 3 2-Amino-5-(N-ethyl-N-laurylamino)toluene
D- 4 4-[N-Ethyl-N-($\beta$-hydroxyethyl)amino]aniline
D- 5 2-Methyl-4-[N-ethyl-N-($\beta$-hydroxyethyl)amino]aniline
D- 6 N-Ethyl-N-($\beta$-methanesulfonamidoethyl)-3-methyl-4-aminoaniline
D- 7 N-(2-Amino-5-diethylaminophenylethyl)methanesulfonamide
D- 8 N,N-Dimethyl-p-phenylenediamine
D- 9 4-Amino-3-methyl-N-ethyl-N-methoxyethylaniline
D-10 4-Amino-3-methyl-N-ethyl-N-$\beta$-ethoxyethylaniline
D-11 4-Amino-3-methyl-N-ethyl-N-$\beta$-butoxyethylaniline These p-phenylenediamine derivatives may be salts such as sulfuric acid salts, sulfurous acid salts and p-toluenesulfonic acid salts. The above compounds are disclosed, for example, in U.S. Pat. Nos. 2,193,015, 2,552,241, 2,566,271, 2,592,364, 3,656,950 and 3,698,525. The amount of the primary aromatic amine color developing agent which can be used is a concentration of between about 0.1 g and about 20 g, and more preferably a concentration of between about 0.5 g and about 10 g, per liter of developing solution.

As is well known, hydroxylamines can be included in color development baths and such can also be used in this invention.

Although it is possible to use hydroxylamines in the form of free amines in the color developing solution, more typically they are used in the form of water-soluble acid salts. Typical examples of such salts are sulfates, oxalates, chlorides, phosphates, carbonates, acetates and other salts. The hydroxylamines may be either substituted or unsubstituted and the nitrogen atom of the hydroxylamines may be substituted by an alkyl group.

The amount of hydroxylamines which is used is preferably 0 g to 10 g and more preferably 0 to 5 g per liter of color developing solution. If the stability of the color developing solution is to be maintained, it is preferable that the amount used be low.

Furthermore, it is preferable to include sodium sulfite, potassium sulfite, sodium bisulfite, potassium bisulfite, sodium metabisulfite, potassium metabisulfite and other such sulfites and carbonyl sulfite adducts as preservatives. The amount of these which is used is preferably between 0 g and 20 g/liter and more preferably between 0 g and 5 g/liter, and if the stability of the color developing solution is to be maintained, it is preferable that the amount used be low.

Other preservatives include the aromatic polyhydroxy compounds disclosed in JP-A-52-49828, JP-A-56-47038, JP-A-56-32140, JP-A-59-160142 and U.S. Pat. No. 3,746,544; the hydroxyacetones disclosed in U.S. Pat. No. 3,615,503 and G.B. Patent 1,306,176; the α-aminocarbonyl compounds disclosed in JP-A-52-143020 and JP-A53-89425; the various metals disclosed, for example, in JP-A-57-44148 and JP-A-57-53749; the various saccharides disclosed in JP-A-52-102727; the hydroxamates disclosed in JP-A-52-27638; the α,α'-dicarbonyl compounds disclosed in JP-A-59-160141; the salicylates disclosed in JP-A-59-180588; the alkanolamines disclosed in JP-A-54-3532; the poly(alkyleneimines) disclosed in JP-A-56-94349; the gluconic acid derivatives disclosed in JP-A-56-75647 and such like substances. Two or more kinds of these preservatives can be used in combination as required. In particular, the addition of 4,5-dihydroxybenzene m-disulfonic acid, poly(ethyleneimine) and triethanolamine and the like is preferred.

The pH of the color developing solutions used in this invention is preferably between 9 and 12 and more preferably between 9 and 11 and other known developing solution constituent compounds can be present in the color developing solution.

The use of various buffers is preferred to maintain the above pH range. Carbonates, phosphates, borates, tetraborates, hydroxybenzoates, glycine salts, N,N-dimethylglycine salts, leucine salts, norleucine salts, guanine salts, 3,4-dihydroxyphenylalanine salts, alanine salts, aminobutyrates, 2-amino-2-methyl-1,3-propanediol salts, valine salts, proline salts, trishydroxyaminomethane salts, lysine salts and the like can be used as the buffers. In particular, carbonates, phosphates, tetraborates and hydroxybenzoates have the benefits of excellent buffering capacities in the high pH range of pH 9.0 and above and of solubility, they have no adverse effect (such as fogging) on the photographic properties even when they are present in the color developing solution and they are inexpensive, and the use of these buffers is particularly preferred.

Specific examples of these buffers include sodium carbonate, potassium carbonate, sodium bicarbonate, potassium bicarbonate, trisodium phosphate, tripotassium phosphate, disodium phosphate, dipotassium phosphate, sodium borate, potassium borate, sodium tetraborate (borax), potassium tetraborate, sodium o-hydroxybenzoate (sodium salicylate), potassium o-hydroxybenzoate, sodium 5-sulfo-2-hydrox-ybenzoate (sodium 5-sulfosalicylate), potassium 5-sulfo-2-hydroxybenzoate (potassium 5-sulfosalicylate) and the like. However, this invention is not to be construed as being limited to these compounds.

The amount of the buffers which is present in the color developing solution is preferably 0.1 mol/liter or more and particularly preferably between 0.1 mol/liter and 0.4 mol/liter.

In addition, various chelating agents can be used in the color developing solution as calcium- and magnesium-sedimentation preventing agents or in order to improve the stability of the color developing solution.

Organic compounds are preferred as chelating agents, and examples include the aminopolycarboxylic acids disclosed in JP-B-48-030496 and JP-B-44-30232, the organic sulfonates disclosed in JP-A-56-97347, JP-B-56-39359 and West German Patent 2,227,639, the phosphonocarboxylic acids disclosed, for example, in JP-A-52-102726, JP-A-53-42730, JP-A-54-121127, JP-A-55-126241 and JP-A-55-65956 as well as the compounds disclosed in JP-A-195845, JP-A-58-203440 and JP-B-53-40900. Specific examples are given below although the invention is not to be construed as being limited to these.

Nitrilotriacetic acid,
Diethyleneameinopentaacetic acid,
Ethylenediameinetetraacetic acid,
Triethylenetetram:inehexaacetic acid,
Ethylenediamine-N,N,N-trimethylenephosphonic acid,
Ethylenediamine-N,N,N',N'-tetramethylenephosphonic acid,
1,3-Diamino-2-propanol-tetraacetic acid,
Transcyclohexanediaminetetraacetic acid,
Nitrilotripropionic acid,
1,2-Diaminopropanetetraacetic acid,
Hydroxyethyliminodiacetic acid,
Glycol ether diaminetetraacetic acid,
Hydroxyethylenediaminetriacetic acid,
Ethylenediamineorthohydroxyphenylacetic acid,
2-Phosphonobutane-1,2,4-tricarboxylic acid,
1-Hydroxyethane-1,1-diphosphonic acid,
N,N'-Bis(2-hydroxybenzyl)ethylenediamine-N,N'-diacetic acid.

Two or more types of these chelating agents may be used in combination, if required. The amounts of these chelating agents which are present may be any amount sufficient to block the metal ions in the color developing solution; for example, about 0.1 g to 10 g per liter.

Any desired development accelerators can be present in the color developing solution as required.

In addition to benzyl alcohol, the thioetherbased compounds disclosed in, for example, JP-B-37-16088, JP-B-37-5987, JP-B-38-7826, JP-B-44-12380, JP-B-45-9019 and U.S. Patent.3,813,247; the p-phenylenediamine-based compounds disclosed in JP-A-52-49829 and JP-A-50-15554; the quaternary ammonium salts disclosed in, for example, JP-A-50-137726, JP-B-44-30074, JP-A-56-156826 and JP-A-52-43429; the p-aminophenols disclosed in U.S. Pat. Nos. 2,610,122 and 4,119,462; the amine-based compounds disclosed in, for example, U.S. Pat. Nos. 2,494,903, 3,128,182, 4,230,796, 3,253,919, JP-B-41-11431, U.S. Pat. Nos. 2,482,546, 2,596,926 and 3,582,346; the polyalkylene oxides disclosed in, for example, JP-B-37-16088, JP-B-42-25201, U.S. Patent 3,128,183, JP-B-41-11431, JP-B-42-23883 and U.S. Patent 3,532,501 as well as 1-phenyl-3-pyrazolidones, hydrazines, mesoionic compounds, thione-based compounds, imidazoles and the like can be added as development accelerators as required. In particular, thioether-based compounds and 1-phenyl-3-pyrazolidones are preferred.

Any desired antifoggants can be added to the color developing solutions of this invention as required. As the antifoggants, it is possible to use potassium bromide, sodium chloride, potassium iodide and other alkali metal halides and organic antifoggants. As organic antifoggants, it is possible to use, for example, benzotriazole, 6-nitrobenzimidazole, 5-nitroisoindazole, 5-methylbenzotriazole, 5-nitrobenzotriazole, 5-chlorobenzotriazole, 2-thiazolylbenzimidazole, 2-thiazolylmethylbenzimidazole and other nitrogen-containing heterocyclic compounds, 2-mercaptobenzimidazole, 2-mercaptobenzothiazole and other mercapto-substituted heterocyclic compounds, adenine and also mercapto-substituted aromatic compounds such as thiosalicylic acid.

These antifoggants may accumulate in the color developing solution by elution from the silver halide color photographic material during development, although it is preferable that the accumulated amount is small from the point of view of the reduction of the amount of effluent.

Fluorescent brighteners are preferably present in the color developing solutions of this invention. 4,4-Diamino-2,2'-disulfostilbene-based compounds are preferred as fluorescent brighteners; the amount employed being from 0 to 5 g/liter and preferably 0.1 g to 2 g/liter.

Furthermore, various surfactants such as alkylsulfonic acids, arylphosphonic acids, aliphatic carboxylic acids and aromatic carboxylic acids may be employed as required.

The processing temperature of the color developing solutions of this invention is preferably 30 to 50° C. and more preferably 33° to 42° C. The amount of replenisher is 30 to 2,000 ml and preferably 30 to 1,500 ml per $m^2$ of photosensitive material. Lower amounts of replenisher are preferred from the point of view of a reduction in the amount of waste liquid.

Ferric ion complex salts are generally used as bleaching agents in the bleaching baths or bleach-fixing baths which can be used in this invention. Ferric ion complex salts are complexes of ferric ions and chelating agents such as an aminopolycarboxylic acid, an aminopolyphosphonic acid or salts thereof. Aminopolycarboxylic acid salts and aminopolyphosphonic acid salts are alkali metal, ammonium, water-soluble amine and other such salts of aminopolycarboxylic acids or aminopolyphosphonic acids. The alkali metals include sodium, potassium, lithium and the like, and the water-soluble amines include alkylamines such as methylamine, diethylamine, triethylamine and butylamine, cyclic aliamines such as cyclohexylamine, arylamines such as aniline and m-toluidine and heterocyclic amines such as pyridine, morpholine and piperidine.

Representative examples of the chelating agents such as aminopolycarboxylic acids and aminopolyphosphonic acids and salts thereof include:
Ethylenediaminetetraacetic acid
Disodium ethylenediaminetetraacetate
Diammonium ethylenediaminetetraacetate
Ethylenediaminetetraacetic acid tetra(trimethylammonium) salt
Tetrapotassium ethylenediaminetetraacetate
Tetrasodium ethylenediaminetetraacetate
Trisodium ethylenediaminetetraacetate
Diethylenetriaminepentaacetic acid
Pentasodium diethylenetriaminepentaacetate
Ethylenediamine-N-($\beta$-hydroxyethyl)-N,N',N'-triacetic acid
Trisodium ethylenediamine-N-($\beta$-hydroxyethyl)-N,N',N'-triacetate
Triammonium ethylenediamine-N-($\beta$-hydroxyethyl)-N,N',N'-triacetate
Propylenediaminetetraacetic acid
Disodium propylenediaminetetraacetate
Nitrilotriacetic acid
Trisodium nitrilotriacetate
Cyclohexanediaminetetraacetic acid
Disodium cyclohexanediaminetetraacetate
Iminodiacetic acid
Dihydroxyethylglycine
Ethyl ether diaminetetraacetic acid
Glycol ether diaminetetraacetic acid
Ethylenediaminetetrapropionic acid
Phenylenediaminetetraacetic acid
1,3-Diaminopropanol-N,N,N',N'-tetramethylenephosphonic acid
Ethylenediamine-N,N,N',N'-tetramethylenephosphonic
1,3-Propylenediamine-N,N,N',N'-tetramethylenephosphonic acid However, the invention is not to be construed as being limited to these illustrative compounds.

The ferric ion complex salts may be present in the form of complex salts, or ferric ion complex salts may be formed in solution using chelating agents such as aminopolycarboxylic acids, aminopolyphosphonic acids or phosphonocarboxylic acids with ferric salts: for example, ferric sulfate, ferric chloride, ferric nitrate, ferric ammonium sulfate, ferric phosphate and the like. When used in the form of complex salts, one kind of complex salt may be used, or two or more kinds of complex salts may be used. When, on the other hand, the complex salts are formed in solution using chelating agents and ferric salts, one kind or two or more kinds of ferric salts may be used. Furthermore, one kind or two or more kinds of chelating agents may be used. Moreover, in all these cases, the chelating agent may be present in excess of the amount for forming the ferric ion complex salts. Of the iron complexes, aminopolycarboxylic acid iron complexes are preferred, the amount present being 0.01 to 1.0 mol/liter and preferably 0.05 to 0.50 mol/liter.

Moreover, bleach accelerators can be present in the bleach bath or the bleach-fixing bath as required. Specific examples of useful bleach accelerators include compounds having a mercapto group or a disulfide group, as disclosed, for example, in U.S. Pat. No. 3,893,858, West German Patents 1,290,812 and 2,059,988, JP-A-53-32736, JP-A-53-57831, JP-A-53-37418, JP-A-53-65732, JP-A-5372623, JP-A-53-95630, JP-A-53-95631, JP-A-53-104232, JP-A-53-124424, JP-A-53-141623, JP-A-53-28426, and *Research Disclosure*, No. 17129 (July, 1978); the thiazolidene derivatives disclosed in JP-A-50-140129; the thiourea derivatives disclosed in JP-B-45-8506, JP-A-52-20832, JP-A-53-32735 and U.S. Pat. No. 3,706,561; iodides disclosed in JP-A-58-16235; the polyethylene oxides disclosed in West German Patents 966,410 and 2,748,430; the polyamine compounds disclosed in JP-B-45-8836; and also the compounds disclosed in JP-A-49-42434, JP-A-49-59644, JP-A-53-94927, JP-A-54-35727, JP-A-55-26506 and JP-A-58-163940 and iodine or bromine ions and the like. Of these compounds, compounds having mercapto groups or disulfide groups are preferred from the point of view of their superior accelerating effect and the compounds disclosed in U.S. Pat. No. 3,893,858, West German Patent 1,290,812 and JP-A-53-95630 are particularly preferred.

In addition, it is possible to include rehalogenating agents such as bromides (for example, potassium bromide, sodium bromide, ammonium bromide), or chlorides (for example, potassium chloride, sodium chloride, ammonium chloride) or iodides (for example, ammonium iodide) in the bleaching baths or bleach-fixing baths of this invention. If required, it is possible to use one or more inorganic acid, organic acid and alkali metal or ammonium salts thereof having a pH buffering capacity such as boric acid, borax, sodium metaborate, acetic acid, sodium acetate, sodium carbonate, potassium carbonate, phosphorous acid, phosphoric acid, sodium phosphate, citric acid and sodium citrate as well as anticorrosion agents such as ammonium nitrate and guanidine.

The fixing agents which are present in the bleach-fixing bath or fixing bath of this invention are known fixing agents, i.e., thiosulfates such as sodium thiosulfate and ammonium thiosulfate; thiocyanates such as sodium thiocyanate and ammonium thiocyanate; thioether compounds and thioureas such as ethylenebisthioglycolic acid and 3,6-dithia-1,8-octanediol and other such water-soluble silver halide solvents and these can be present either alone or as a mixture of two or more kinds. Furthermore, it is also possible to use the special bleach-fixing baths formed by combining large amounts of halides such as potassium iodide with fixing agents and the like as disclosed in JP-A-55-155354. The use of thiosulfates, and in particular, of ammonium thiosulfate, is preferred in this invention.

The amount of fixing agent per liter is preferably in the range of 0.3 to 2 mols and more preferably 0.5 to 1.0 mol.

The pH range of the bleach-fixing bath and the fixing bath in this invention is preferably 3 to 10, and more particularly preferably 4 to 9. When the pH is lower than this, the desilvering properties are improved but the degradation of the bath and the conversion to leuco dye of the cyan dye are accelerated. Conversely, when the pH is higher than this, desilvering is delayed and staining readily occurs.

In order to adjust the pH, it is possible to add hydrochloric acid, sulfuric acid, nitric acid, acetic acid (glacial acetic acid), bicarbonate salts, ammonia, potassium hydroxide, sodium hydroxide, sodium carbonate, potassium carbonate and the like.

In addition, it is also possible to include various fluorescent brighteners and defoaming agents or surfactants and organic solvents such as polyvinyl pyrrolidone or methanol in the bleach-fixing bath.

The bleach-fixing baths and the fixing baths of this invention contain, as preservatives, sulfite ion-releasing compounds such as sulfites (for example, sodium sulfite, potassium sulfite, ammonium sulfite), bisulfites (for example, ammonium bisulfite, sodium bisulfite, potassium bisulfite), metabisulfites (for example, potassium metabisulfite, sodium metabisulfite, ammonium metabisulfite). It is preferable to include these compounds at about 0.02 to 0.50 mol/liter calculated as sulfite ions and an amount of 0.04 to 0.40 mol/liter is preferred.

It is usual to use sulfites as preservatives although, in addition to these, ascorbic acid and carbonyl bisulfite adducts or carbonyl compounds and the like may also be employed.

Furthermore, buffers, fluorescent brighteners, chelating agents, antifungal agents and the like may be used as required.

The washing stage used in this invention is now explained. With this invention, it is also possible to use a simple processing method such as that wherein the washing stage is not provided per se, but only so-called "stabilization processing" is carried out instead of the usual "washing processing". Thus, the term "washing processing" as used with this invention is employed in the above broader sense.

In this invention, the use of about 1,000 ml or more and more preferably of about 5,000 ml or more to each 1 m² of photosensitive material is preferred in the case of, for example, a three-tank counter-flow wash. Furthermore, 100 to 1,000 ml may be used to 1 m² of photosensitive material in the case of processing with saving of water.

The washing temperature is 15° C. to 45° C. and preferably 20° C. to 35° C. In the washing process, various known compounds may be added to prevent sedimentation and to stabilize the washing water. For example, it is possible to add, as required, inorganic phosphoric acid, aminopolycarboxylic acids, organic phosphonic acid and other such chelating agents, bactericides and antifungal agents which prevent the growth of various kinds of bacteria, algi and fungi (for example, the compounds disclosed in *The Journal of Antibacterial and Antifungal Agents,* Vol. 11, No. 5, pp. 207-223 (1983) and the compounds disclosed in Hiroshi Horiguchi, *Antibacterial and Antifungal Chemistry,* Sankyo Publishing (1982), metal salts as represented by magnesium salts and aluminum salts, alkali metals and ammonium salts or surfactants and the like for preventing drying marks and the drying load. Alternatively, the compounds disclosed in, for example, West, *Photographic Science and Engineering,* Vol. 6, pp. 344-359 (1965) may also be used.

Furthermore, this invention is particularly effective where the amount of washing water is greatly reduced by adding antibacterial agents, antifungal agents and chelating agents to the washing water and carrying out a multistage counter-flow wash with two or more tanks. Moreover, it is also particularly effective where a multistage counter-flow stabilization process (so-called stabilization processing) as disclosed in JP-A-57-8543 is carried out instead of the usual washing process. In these cases, the bleach-fixing constituents carried in the final bath are $5 \times 10^{-2}$ liter or less and preferably $1 \times 10^{-2}$ liter or less.

Various compounds can be present in this stabilization bath in order to stabilize the image. Representative examples include various buffers for adjusting the film pH (to pH 3 to 8, for instance) (for example, the combined use of borates, metaborates, borax, phosphates, carbonates, potassium hydroxide, sodium hydroxide, aqueous ammonia, monocarboxylic acids, dicarboxylic acids, polycarboxylic acids and the like) and aldehydes such as formaldehyde. In addition, various additives such as chelating agents (inorganic phosphoric acid, aminopolycarboxylic acid, organic sulfonic acid, aminopolysulfonic acid, phosphonocarboxylic acid and the like), bactericides (thiazole-based, isothiazole-based, halogenated phenols, sulfanylamides, benzotriazoles and the like), surfactants, fluorescent brighteners, film hardening agents and the like may be present and two or more compounds may be present in combination for the same or different purposes.

Furthermore, the use of various ammonium salts such as ammonium chloride, ammonium nitrate, ammonium sulfate, ammonium phosphate, ammonium sulfite and ammonium thiosulfate as film pH adjusters after processing is preferred in that this improves the image storage properties.

Where the amount of washing water has been greatly reduced as above, the inflow of part or all of the overflow liquid from the washing water into the bleach-fixing bath or the stabilization bath, which are prebaths, is preferred from the point of view of the reduction in the amount of waste liquid.

With continuous processing using these processing methods, a set finish is obtained by preventing change in the liquid compositions using replenisher for the various processing liquids. The amounts of replenisher can be reduced to half or to less than half of the standard replenishment amounts in order, for example, to reduce costs.

Heaters, thermal sensors, liquid level sensors, circulating pumps, filters, various floating lids, various squeegees, nitrogen agitators, air agitators and the like may be provided in the various processing baths as desired.

The color photographic processing can be applied to any processing method provided the processing makes use of color developing solutions. For example, it can be applied to the processing of color papers, color reversal papers, color positive films, color negative films, color reversal films and the like.

This invention is explained in further detail below by reference to the following examples, which are not to be construed as limiting the present invention. Unless otherwise indicated, all parts, percents, ratios and the like are by weight.

EXAMPLE 1

Color Photographic Materials 1-1 to 1-10 were prepared by multilayered coating from Layer 1 to Layer 14 on one side, and from Layer 15 to Layer 16 on the other side, of paper supports (thickness: 100 μm) laminated on both sides with polyethylene. The polyethylene on the side of the first coated layer contained titanium oxide as a white pigment and a small amount of ultramarine as a blue dye (the chromaticity of the surface of the support was 88.0, −0.20 and −0.75 for $L^*$, $a^*$ and $b^*$, respectively).

Composition of the Photosensitive Layers

Constituents and their coated amounts (g/m² units) are shown below. Furthermore, silver halides are shown in coated amounts calculated as silver. The emulsions used in each layer were prepared following the preparation method for the emulsion EM 1. However, a Lipman emulsion without surface chemical sensitization was used as the emulsion for Layer 14.

| Layer 1: Antihalation Layer | |
|---|---|
| Black Colloidal Silver | 0.10 |
| Gelatin | 0.70 |
| Layer 2: Intermediate Layer | |
| Gelatin | 0.70 |
| Layer 3: Low Speed Red-Sensitive Layer | |
| Silver Bromide (spectrally sensitized with red-sensitizing dyes (ExS-1, 2, 3); average grain size: 0.25 μm, size distribution (variation coefficient): 8%, octahedral) | 0.04 |
| Silver Chlorobromide (spectrally sensitized with red-sensitizing dyes (ExS-1, 2, 3); 5 mol % silver chloride, average grain size: 0.40 μm, size distribution: 10%, octahedral) | 0.08 |
| Gelatin | 1.00 |
| Cyan Coupler (ExC-1, 2, in equal amounts) | 0.30 |
| Antifading Agent (Cpd-1, 2, 3, 4 in equal amounts) | 0.18 |
| Antistaining Agent (Cpd-5) | 0.003 |
| Coupler Dispersant (Cpd-6) | 0.03 |
| Coupler Solvent (Solv-1, 2, 3 in equal amounts) | 0.12 |
| Layer 4: High Speed Red-Sensitive Layer | |
| Silver Bromide (spectrally sensitized with red-sensitizing dyes (ExS-1, 2, 3); average grain size: 0.60 μm, size distribution: 15%, octahedral) | 0.14 |
| Gelatin | 1.00 |
| Cyan Couplers (ExC-1, 2 equal amounts) | 0.30 |
| Antifading Agents (Cpd-1, 2, 3, 4 in equal amounts) | 0.18 |
| Antistaining Agent (Cpd-5) | 0.003 |
| Coupler Dispersant (Cpd-6) | 0.03 |
| Coupler Solvents (Solv-1, 2, 3 in equal amounts) | 0.12 |
| Layer 5: Intermediate Layer | |
| Gelatin | 1.00 |
| Antifading Agent (Cpd-7) | 0.08 |
| Color Mixing Preventing Agent | 0.18 |
| Solvent (Solv-4, 5 in equal amounts) | 0.16 |
| Polymer Latex (Cpd-8) | 0.10 |
| Layer 6: Low Speed Green-Sensitive Layer | |
| Silver Bromide (spectrally sensitized with green-sensitizing dye (ExS-4); average grain size: 0.25 μm, size distribution: 8%, octahedral) | 0.09 |
| Silver Chlorobromide (spectrally sensitized with green-sensitizing dye (ExS-4); silver chloride: 5 mol %, average grain size: 0.40 μm, size distribution: 10%, octahedral) | 0.13 |
| Gelatin | 0.80 |
| Magenta Coupler (ExM-1) | 0.14 |
| Antifading Agent (Cpd-9) | 0.10 |
| Antistaining Agent (Cpd-10, 11, 12, 13 in a 10/7/7/1 ratio) | 0.025 |
| Coupler Dispersant (Cpd-6) | 0.05 |
| Coupler Solvent (Solv-4, 6 in equal amounts) | 0.18 |
| Layer 7: High Speed Green-Sensitive Layer | |
| Silver Bromide (spectrally sensitized with green-sensitizing dye (ExS-4); average grain size: 0.65 μm, size distribution: 16%, octahedral) | 0.22 |
| Gelatin | 0.80 |
| Magenta Coupler (ExM-1) | 0.14 |
| Antifading Agent (Cpd-9) | 0.10 |
| Antistaining Agent (Cpd-10, 11, 12, 13 in a 10/7/7/1 ratio) | 0.025 |
| Coupler Dispersant (Cpd-6) | 0.05 |
| Coupler Solvent (Solv-4, 6 in equal amounts) | 0.18 |
| Layer 8: Intermediate Layer | |
| Same as Layer 5 | |
| Layer 9: Yellow Filter Layer | |
| Yellow Colloidal Silver | 0.12 |
| Gelatin | 0.07 |
| Color Mixing Preventing Agent (Cpd-7) | 0.03 |
| Color Mixing Preventing Agent Solvent (Solv-4, 5 in equal amounts) | 0.10 |
| Polymer Latex (Cpd-8) | 0.07 |
| Layer 10: Intermediate Layer | |
| Same as Layer 5 | |
| Layer 11: Low Speed Blue-Sensitive Layer | |
| Silver Bromide (spectrally sensitized with blue-sensitizing dyes (ExS-5, 6); average grain size: 0.40 μm, size distribution: 8%, octahedral) | 0.07 |
| Silver Chlorobromide (spectrally sensitized with blue-sensitizing dyes (ExS-5, 6); silver chloride: 8 mol %, average grain size: 0.60 μm, size distribution: 11%, octahedral) | 0.14 |
| Gelatin | 0.80 |
| Yellow Coupler (ExY-1) | 0.35 |
| Antifading Agent (Cpd-14) | 0.10 |
| Antistaining Agent (Cpd-5, 15 in a 1/5 ratio) | 0.007 |
| Coupler Dispersant (Cpd-6) | 0.05 |
| Coupler Solvent (Solv-2) | 0.10 |
| Layer 12: High Speed Blue-Sensitive Layer | |
| Silver Bromide (spectrally sensitized with blue-sensitizing dyes (ExS-5, 6); average grain size: 0.85 μm, size distribution: 18%, octahedral) | 0.15 |
| Gelatin | 0.60 |
| Yellow Coupler (ExY-1) | 0.30 |
| Antifading Agent (Cpd-14) | 0.10 |
| Antistaining Agent (Cpd-5, 15 in a 1/5 ratio) | 0.007 |
| Coupler Dispersant (Cpd-6) | 0.05 |
| Coupler Solvent (Solv-2) | 0.10 |
| Layer 13: Ultraviolet Absorbing Layer | |
| Gelatin | 1.00 |

| -continued | |
|---|---|
| Ultraviolet Absorbing Agent (Cpd-2, 4, 16 in equal amounts) | 0.50 |
| Color Mixing Preventing Agent (Cpd-7, 17 in equal amounts) | 0.03 |
| Dispersant (Cpd-6) | 0.02 |
| Ultraviolet Absorbing Agent Solvent (Solv-2, 7 in equal amounts) | 0.08 |
| Antiirradiation Dye (Cpd-18, 19, 20, 21 in a 10/10/13/15 ratio) | 0.04 |
| Layer 14: Protective Layer | |
| Fine Grain Silver Chlorobromide (silver chloride: 97 mol %, average size: 0.2 μm) | 0.03 |
| Acrylic Modified Copolymer of Polyvinyl Alcohol | 0.01 |
| Polymethyl Methacrylate Particles (average particle size: 2.4 μm) and Silicon Oxide (average particle size: 5 μm) in Equal Amounts | 0.05 |
| Gelatin | 1.80 |
| Gelatin Hardening Agent (H-1, H-2 in equal amounts) | 0.18 |
| Layer 15: Backing Layer | |
| Gelatin | 2.50 |
| Layer 16: Backing Hardening Layer | |
| Polymethyl Methacrylate Particles (average particle size: 2.4 μm) and Silicon Oxide (average particle size: 5 μm) in Equal Amounts | 0.05 |
| Gelatin | 2.00 |
| Gelatin Hardening Agent (H-1, H-2 in equal amounts) | 0.14 |
| In Materials 1-2 and 1-5 to 1-10, Layer 6 and Layer 7 were coated but altered as shown below. | |
| Layer 6: Low Speed Green-Sensitive Layer | |
| Silver Bromide (spectrally sensitized with green-sensitizing dye (ExS-4); average grain size: 0.25 μm, size distribution: 8%, octahedral) | 0.04 |
| Silver Chlorobromide (spectrally sensitized with green-sensitizing dye (ExS-4); silver chloride: 5 mol %, average grain size: 0.40 μm, size distribution: 10%, octahedral) | 0.06 |
| Gelatin | 0.80 |
| Magenta Coupler (ExM-2, 3 in equal amounts) | 0.11 |
| Antifading Agent (Cpd-9) | 0.10 |
| Antistaining Agent (Cpd-10, 11, 12, 13 in a 10/7/7/1 ratio) | 0.025 |
| Coupler Dispersant (Cpd-6) | 0.05 |
| Coupler Solvent (Solv-4, 6 in equal amounts) | 0.15 |
| Layer 7: High Speed Green-Sensitive Layer | |
| Silver Bromide (spectrally sensitized with green-sensitizing dye (ExS-4); average particle size: 0.65 μm, size distribution: 16%, octahedral) | 0.10 |
| Gelatin | 0.80 |
| Magenta Coupler (ExM-2, 3 in equal amounts) | 0.11 |
| Antifading Agent (Cpd-9) | 0.10 |
| Antistaining Agent (Cpd-10, 11, 12, 13 in a 10/7/7/1 ratio) | 0.025 |
| Coupler Dispersant (Cpd-6) | 0.05 |
| Coupler Solvent (Solv-4, 6 in equal amounts) | 0.15 |

Furthermore, in Materials 1-3 to 1-9, in addition to the antiirradiation dye of Layer 13, the compound of this invention was coated in a coated amount of $7 \times 10^{-5}$ mol/m². At this time, the proportions and the amounts used of Cpd-18, 19, 20 and 21 were adjusted such that the sensitivities of the various R, G and B layers were not altered.

In addition, dyes were not used in Material 1-10.

Preparation of Emulsion EM 1

Octahedral silver bromide grains with an average grain size of 0.40 μm were prepared by vigorously stirring an aqueous gelatin solution while simultaneously adding an aqueous solution of potassium bromide and silver nitrate at 75° C. for 15 minutes. Chemical sensitization was carried out by the sequential addition, per xol of Ag in the emulsion, of 0.3 g of 3,4-dimethyl-1,3-thiazoline-2-thione, 6 mg of sodium thiosulfate and 7 mg of chloroauric acid (tetrahydrate) at 75° C. for 80 minutes. Finally, an octahedral monodispersed core/shell silver bromide emulsion with an average grain size of 0.7 μm was obtained by further growth under similar precipitation conditions to those of the first stage, using the grain thus obtained as the core. The variation coefficient of the grain size was approximately 10%. An internal latent image type silver halide emulsion was obtained by carrying out chemical sensitization by adding 1.5 mg of sodium thiosulfate and 1.5 mg of chloroauric acid (tetrahydrate) per mol of silver to this emulsion and heating at 60° C. for 60 minutes.

In each sensitive layer, ExZK-1 and ExZK-2 were used as nucleating agents respectively in amounts of $10^{-3}$ wt % with respect to the silver halide and Cpd-22 was used as a nucleation accelerator in an amount of $10^{-2}$ wt %. Furthermore, Alkanol XC (the Du Pont Company) and sodium alkylbenzenesulfonate were used as auxiliary emulsification and dispersion agents, and succinic acid esters and Magefac F-120 (made by the Dainippon Ink Company) were used as coating agents in each layer. Cpd-23, 24, 25 were used as stabilizers in silver halide- and colloidal silver-containing layers. These materials were designated Materials No. 1-1 to 1-10. The compounds used in the materials described above are shown below.

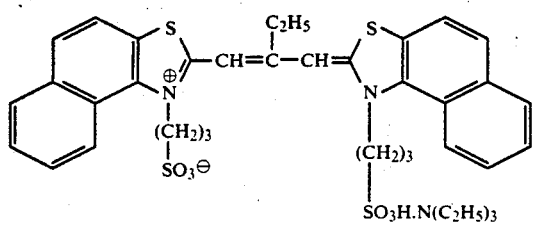

ExS-1

-continued
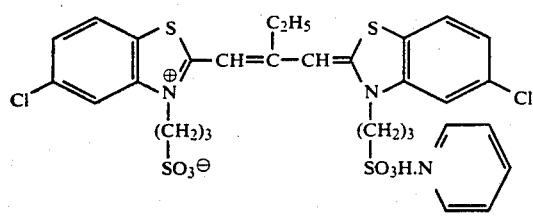
ExS-2
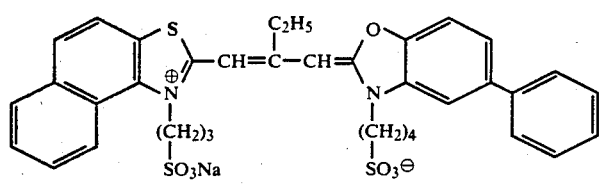
ExS-3
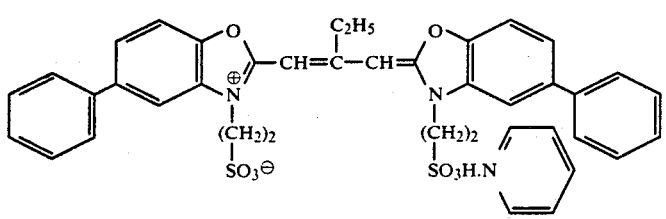
ExS-4
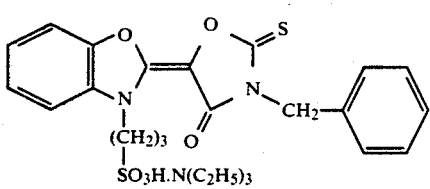
ExS-5
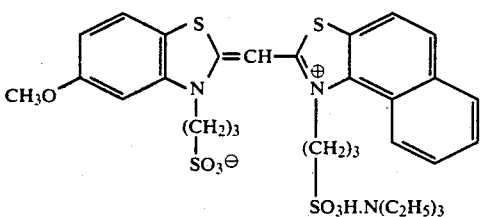
ExS-6
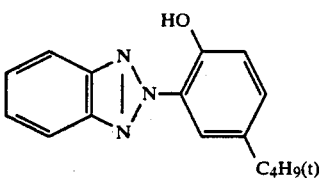
Cpd-1
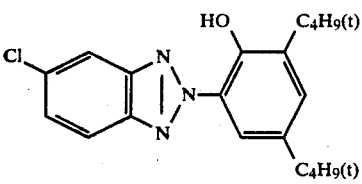
Cpd-2
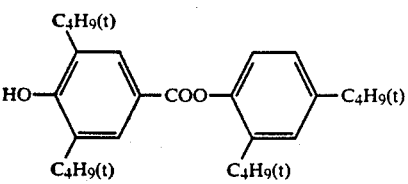
Cpd-3

-continued
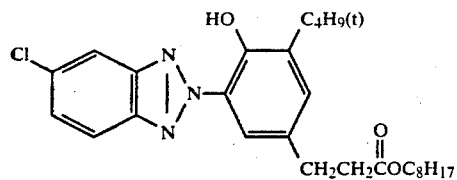
Cpd-4
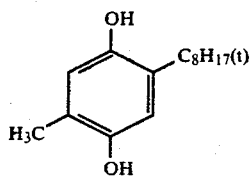
Cpd-5
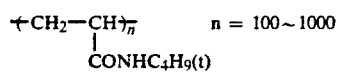
n = 100~1000
Cpd-6
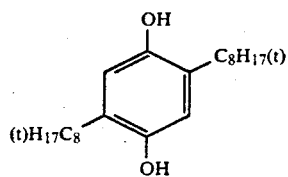
Cpd-7
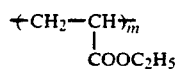
Cpd-8
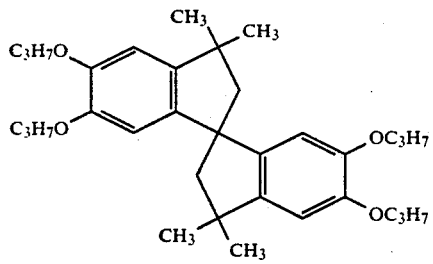
Cpd-9
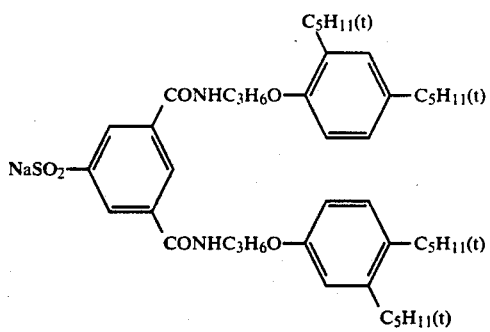
Cpd-10
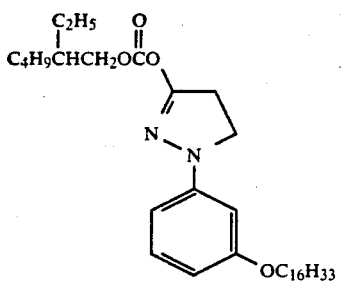
Cpd-11

-continued
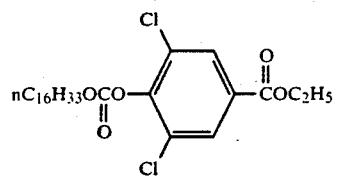
Cpd-12
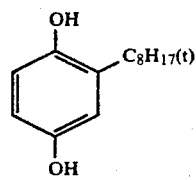
Cpd-13
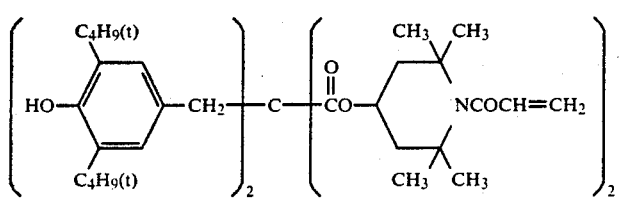
Cpd-14
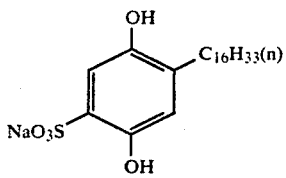
Cpd-15
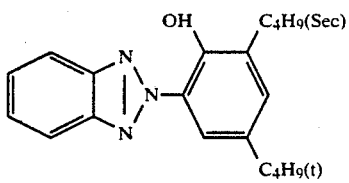
Cpd-16
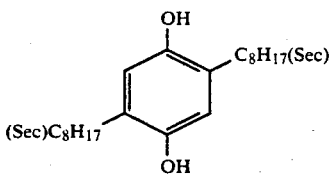
Cpd-17
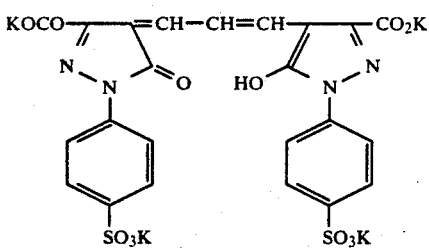
Cpd-18
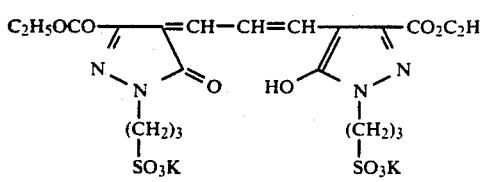
Cpd-19

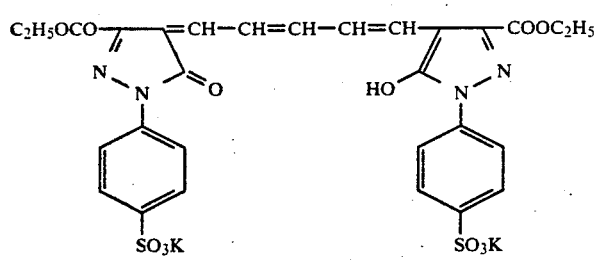 Cpd-20
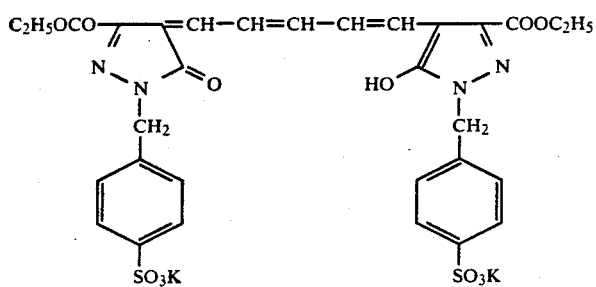 Cpd-21
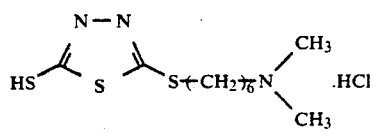 Cpd-22
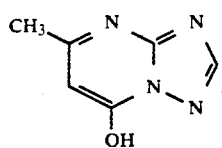 Cpd-23
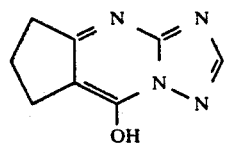 Cpd-24
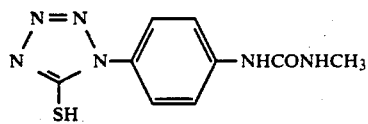 Cpd-25
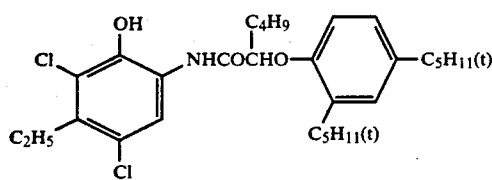 ExC-1
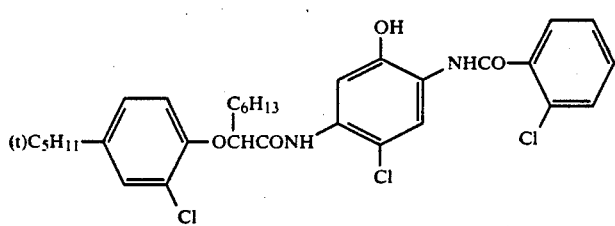 ExC-2

-continued

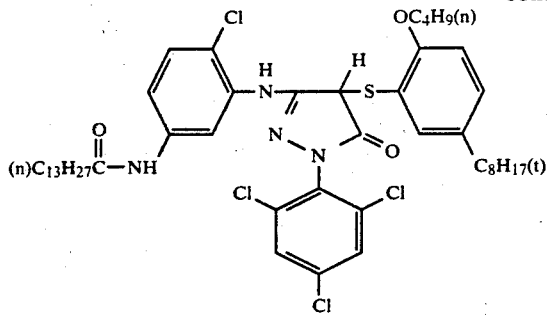 ExM-1

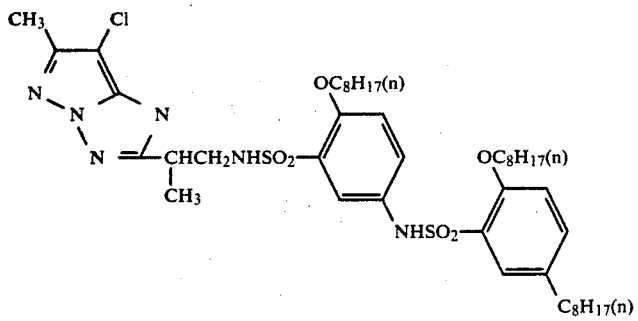 ExM-2

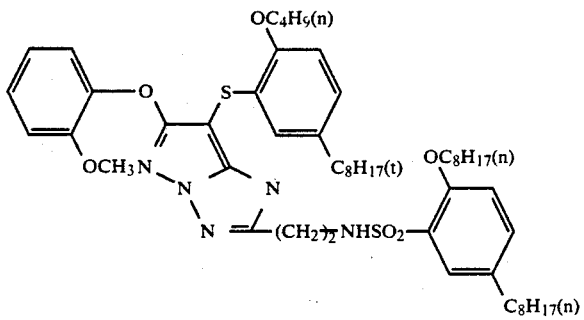 ExM-3

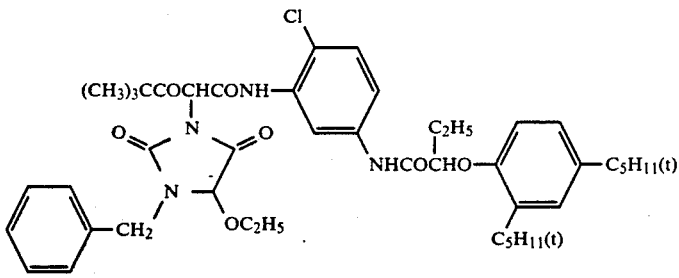 ExY-1

Solv-1 Di(2-ethylhexyl) sebacate
Solv-2 Trinonyl phosphate
Solv-3 Di(3-methylhexyl) phthalate
Solv-4 Tricresyl phosphate
Solv-5 Dibutyl phthalate
Solv-6 Trioctyl phosphate
Solv-7 Di(2-ethylhexyl) phthalate
H-1 1,2-bis(Vinylsulfonylacetamido)ethane
H-2 4,6-Dichloro-2-hydroxy-1,3,5-triazine sodium salt
ExZK-1 7-[3-(5-Mercaptotetrazol-1-yl)benzamido]-10-propargyl-1,2,3,4-tetrahydroacridinium perchlorate
ExZK-2 1-Formyl-2-{4-[3-{3-[3-(5-mercaptotetrazol-1-yl)phenyl]ureido}benzenesulfonamido]phenyl}-hydrazine Materials 1-1 to 1-10 prepared in this way differ in the antiirradiation dye and the magenta couplers used, and their various compositions are shown together with the results for these examples in Table I.

A Macbeth color checkers were photographed on color negative films (SHR-100 made by the Fuji Photo Film Co., Ltd.) and printed on color papers (102 A made by the Fuji Photo Film Co., Ltd.) to prepare originals. Color prints were obtained by exposing these originals onto Materials 1-1 to 1-10 using the usual reflecting type of printer and carrying out development processing with the processing methods shown below.

The density and color setting of the prints was such that the neutral 5 gray patch of the Macbeth checker on the color paper sheet was a gray with a density of 1.0.

Development processing was carried out using the processes shown below. The Munsell chroma value was calculated from the measured value in order to observe the reproduction of the red, green and blue colors of the image.

On the other hand, Materials 1-1 to 1-10 were exposed through a plain glass to 500 CMS light from a light source of 3,200° K and were subjected to the development processes shown below, in order to observe the extent of staining of the image in each material caused by the dyes remaining after processing. The development processing time was shortened in these cases in order to enhance the extent of staining. The sharpness was evaluated for Materials 1-1 to 1-10 both at "30 seconds of color formation" and after processing. For sharpness, C, T, F (%) were investigated at a spatial frequency of 15 lines/mm.

Processing Methods Used in the Examples

After image exposure, continuous processing was carried out using an automatic developing apparatus and the method mentioned below such that the accumulated replenishment amount of color developing solution reached 3 times the tank capacity.

| Processing Stage | Time (sec) | Temperature (°C.) | Tank Solution Tank Capacity (l) | Amount of Replenisher (ml/m$^2$) |
|---|---|---|---|---|
| Color Development | 90 | 38 | 8 | 300 |
| Bleach-Fixing | 40 | 33 | 3 | 300 |
| Wash (1) | 40 | 33 | 3 | — |
| Wash (2) | 40 | 33 | 3 | — |
| Wash (3) | 15 | 33 | 0.5 | 320 |
| Drying | 30 | 80 | | |

The replenishment method for the washing water was the so-called counter-flow replenishment method in which water was supplied to the washing bath (3), the overflow from the washing bath (3) was directed into the washing bath (2) and the overflow from the washing bath (2) was directed into the washing bath (1). At this time, the amount of carry-over of bleach-fixing solution from the bleach-fixing bath to the washing bath (1) by the photosensitive material was 35 ml/m$^2$, and the amount of replenishing water supplied was 9.1 times the amount of carry-over of the bleach-fixing solution.

The compositions of the various processing solutions were as shown below.

| | Tank Solution | Replenisher |
|---|---|---|
| Color Developing Solution: | | |
| Ethylenediaminetetrakis-methylenephosphonic Acid | 0.5 g | 0.5 g |
| Diethylene Glycol | 10 ml | 10 ml |
| Benzyl Alcohol | 12.0 g | 14.4 ml |
| Potassium Bromide | 0.65 g | |
| Sodium Sulfite | 2.4 g | 2.9 g |
| N,N-Diethylhydroxylamine | 4.0 g | 4.8 g |
| Trimethylenediamine(1,4-diazabicyclo[2,2,2]octane) | 4.0 g | 4.8 g |
| N-Ethyl-N-($\beta$-methanesulfonamido-ethyl)-3-methylaniline Sulfate | 5.6 g | 6.6 g |
| Potassium Carbonate | 27.0 g | 25.0 g |
| Fluorescent Brightener (diaminostilbene-based) | 1.0 g | 1.2 g |
| Water to make | 1,000 ml | 1,000 ml |
| pH (25° C.) | 10.50 | 10.80 |
| Bleach-Fixing Solution: | | |
| Disodium Ethylenediamine-tetraacetate Dihydrate | 4.0 g | Same as tank solution |
| Ammonium (Ethylenediaminetetra-acetato)Fe(III) Dihydrate | 46.0 g | |
| Ammonium Thiosulfate (700 g/l) | 155 ml | |
| Sodium p-Toluenesulfinate | 20.0 g | |
| Sodium Bisulfite | 12.0 g | |
| Ammonium Bromide | 50.0 g | |
| Ammonium Nitrate | 30.0 g | |
| Water to make | 1,000 ml | |
| pH (25° C.) | 6.20 | |

Washing Water

In both the tank solution and replenisher, city water was treated by passing through a mixed bed type column charged with a strongly acidic H-type cation exchange resin (Amberlite IR-120 B made by the Rohm & Haas Co.) and an OH-type anion exchange resin (Amberlite IR-400 made by the Rohm & Haas Co.) and the calcium and magnesium ion concentrations each was reduced to less than 3 mg/liter, and following this, sodium dichloroisocyanurate (20 mg/liter) and sodium sulfate (1.5 g/liter) were added. The pH of this liquid was within the range of 6.5 to 7.5.

The results are shown in Table 1 below.

TABLE I

| Test Material No. | Magenta Couplers Used in Layers 6 and 7 | Dyes Used in Layer 13 | Color Reproduction (chroma) Red | Green | Staining after Processing C Density | M Density | Sharpness Magenta | Cyan |
|---|---|---|---|---|---|---|---|---|
| 1-1 (Comparison) | ExM-1 | Cpd-18, 19, 21 only | 9.0 | 8.8 | 0.15 | 0.18 | 31.6 | 31.5 |
| 1-2 (Comparison) | ExM-2 and ExM-3 | Cpd-18, 19 21 only | 9.6 | 8.9 | 0.15 | 0.18 | 32.0 | 31.6 |
| 1-3 (Comparison) | ExM-1 | 1-46 | 9.5 | 9.2 | 0.13 | 0.16 | 31.8 | 33.2 |
| 1-4 (Comparison) | ExM-1 | 1-5 | 9.6 | 9.3 | 0.11 | 0.14 | 32.2 | 32.8 |
| 1-5 (Invention) | ExM-2 and ExM-3 | 1-46 | 11.1 | 9.8 | 0.12 | 0.15 | 32.5 | 33.8 |
| 1-6 (Invention) | ExM-2 and ExM-3 | 1-5 | 11.2 | 9.9 | 0.11 | 0.14 | 32.8 | 34.0 |
| 1-7 (Invention) | ExM-2 and ExM-3 | 1-6 | 10.9 | 9.8 | 0.10 | 0.14 | 32.5 | 33.8 |
| 1-8 (Invention) | ExM-2 and ExM-3 | 1-22 | 10.8 | 9.8 | 0.11 | 0.14 | 33.0 | 33.5 |
| 1-9 (Invention) | ExM-2 and ExM-3 | 1-25 | 10.8 | 9.9 | 0.11 | 0.14 | 33.2 | 32.8 |
| 1-10 (Invention) | ExM-2 and ExM-3 | — | 9.4 | 8.8 | 0.11 | 0.14 | 26.1 | 27.9 |

As is clear from the results in Table I, materials with excellent color reproduction and sharpness are obtained according to this invention. Moreover, there are also obtained highly outstanding whiteness in the white parts.

EXAMPLE 2

Color photographic materials in which the following 12 layers were sequentially coated from Layer 1, Materials 2-1 to 2-15, were prepared on paper supports which had been laminated on both sides with polyethylene. The side of the first coated layer of the polyethylene contained titanium white as a white pigment and small amounts of ultramarine blue as a blue pigment.

Photosensitive Layer Composition

The compositions and the coated amounts, in units of g/m$^2$, are shown below. Moreover, silver halides are shown as the coated amount calculated as silver.

| Layer 1: Gelatin Layer | |
|---|---|
| Gelatin | 1.30 |
| Layer 2: Antihalation Layer | |
| Black Colloidal Silver | 0.10 |
| Gelatin | 0.70 |
| Layer 3: Low Speed Red-Sensitive Layer | |
| Silver Iodobromide (spectrally sensitized with red-sensitizing dyes (*1 and *2); silver iodide: 5.0 mol %, average grain size: 0.4 μm) | 0.15 |
| Gelatin | 1.00 |
| Cyan Coupler (*3) | 0.14 |
| Cyan Coupler (*4) | 0.07 |
| Antifading Agent (*5, *6 and *7) | 0.10 |
| Coupler Solvent (*8 and *9) | 0.06 |
| Layer 4: High Speed Red-Sensitive Layer | |
| Silver Iodobromide (spectrally sensitized with red-sensitizing dyes (*1 and *2); silver iodide: 6.0 mol %, average grain size: 0.7 μm) | 0.15 |
| Gelatin | 1.00 |
| Cyan Coupler (*3) | 0.20 |
| Cyan Coupler (*4) | 0.10 |
| Antifading Agent (*5, *6 and *7) | 0.15 |
| Coupler Solvent (*8 and *9) | 0.10 |
| Layer 5: Intermediate Layer | |
| Magenta Colloidal Silver | 0.02 |
| Gelatin | 1.00 |
| Color Mixing Preventing Agent (*10) | 0.08 |
| Color Mixing Preventing Agent Solvent (*11 and *12) | 0.16 |
| Polymer Latex (*13) | 0.10 |
| Layer 6: Low Speed Green-Sensitive Layer | |
| Silver Iodobromide (spectrally sensitized with green-sensitizing dye (*14); silver iodide: 2.5 mol %, grain size: 0.4 μm) | 0.20 |
| Gelatin | 0.80 |
| Magenta Coupler (*15) | 0.10 |
| Antifading Agent (*16) | 0.10 |
| Antistaining Agent (*17) | 0.01 |
| Antistaining Agent (*18) | 0.001 |
| Coupler Solvent (*11 and *19) | 0.15 |
| Layer 7: High Speed Green-Sensitive Layer | |
| Silver Iodobromide (spectrally sensitized with green-sensitizing dye (*14); silver iodide: 3.5 mol %, grain size: 0.9 μm) | 0.10 |
| Gelatin | 0.80 |
| Magenta Coupler (*15) | 0.20 |
| Antifading Agent (*16) | 0.10 |
| Antistaining Agent (*17) | 0.01 |
| Antistaining Agent (*18) | 0.001 |
| Coupler Solvents (*11 and *19) | 0.15 |
| Layer 8: Yellow Filter Layer | |
| Yellow Colloidal Silver | 0.20 |
| Gelatin | 1.00 |
| Color Mixing Preventing Agent (*10) | 0.06 |
| Color Mixing Preventing Agent Solvent (*11 and *12) | 0.15 |
| Polymer Latex (*13) | 0.10 |
| Layer 9: Low Speed Blue-Sensitive Layer | |
| Silver Iodobromide (spectrally sensitized with blue-sensitizing dye (*20); silver iodide: 2.5 mol %, grain size: 0.5 μm) | 0.15 |
| Gelatin | 0.50 |
| Yellow Coupler (*21) | 0.20 |
| Antistaining Agent (*18) | 0.001 |
| Coupler Solvent (*9) | 0.05 |
| Layer 10: High Speed Blue-Sensitive Layer | |
| Silver Iodobromide (spectrally sensitized with blue-sensitizing dye (*20); silver iodide: 2.5 mol %, grain size: 1.2 μm) | 0.25 |
| Gelatin | 1.00 |
| Yellow Coupler (*21) | 0.40 |
| Antistaining Agent (*18) | 0.002 |
| Coupler Solvent (*9) | 0.10 |
| Layer 11: Ultraviolet Absorbing Layer | |
| Gelatin | 1.50 |
| Ultraviolet Absorber (*22, *6, and *7) | 1.00 |
| Color Mixing Preventing Agent (*23) | 0.06 |
| Color Mixing Preventing Agent Solvent (*9) | 0.15 |
| Antiirradiation Dye (*24) | 0.02 |
| Antiirradiation Dye (*25) | 0.02 |
| Layer 12: Protective Layer | |
| Fine Grain Silver Chlorobromide (silver chloride: 97 mol %, average grain size: 0.2 μm) | 0.07 |
| Gelatin | 1.50 |
| Gelatin Hardening Agent (*26) | 0.17 |

In Materials 2-3, 2-4 and 2-7 to 2-15, coating was carried out by changing the content of Layer 6 and Layer 7 to those shown below.

| Layer 6: Low Speed Green-Sensitive Layer | |
|---|---|
| Silver Iodobromide (spectrally sensitized with green-sensitizing dye (*14); silver iodide: 2.5 mol %, grain size: 0.4 μm) | 0.10 |
| Gelatin | 0.80 |
| Magenta Coupler (*27) | 0.10 |
| Antifading Agent (*16) | 0.10 |
| Antistaining Agent (*17) | 0.01 |
| Antistaining Agent (*18) | 0.001 |
| Coupler Solvent (*11 and *19) | 0.15 |
| Layer 7: High Speed Green-Sensitive Layer | |
| Silver Iodobromide (spectrally sensitized with green-sensitizing dye (*14); silver iodide: 3.5 mol %, grain size: 0.9 μm) | 0.10 |
| Gelatin | 0.80 |
| Magenta Coupler (*27) | 0.10 |
| Antifading Agent (*16) | 0.10 |
| Antistaining Agent (*17) | 0.01 |
| Antistaining Agent (*18) | 0.001 |
| Coupler Solvent (*11 and *19) | 0.15 |

Moreover, in Materials 2-5 to 2-15, the compounds of this invention other than the antiirradiation dye of the ultraviolet absorbing layer, Layer 11, were coated at coated amounts of $7 \times 10^{-5}$ mol/m$^2$.

At this time, the ratios and the amounts used of *24 and *25 were adjusted so as not to alter the sensitivities of the various R, G and B sensitive layers.

* 1 5,5'-Dichloro-3,3'-di(3-sulfobutyl)-9-ethylthiacarbocyanine sodium salt
* 2 Triethylammonium-3-[2-{2-[3-(3-sulfopropyl)naphtho(1,2-d)thiazoline-2-indenemethyl]-1-butenyl}-3-naphtho(1,2-d)thiazolino]propanesulfonate
* 3 2-[α-(2,4-Di-t-amylphenoxy)hexanamaido]-4,6-dichloro-5-ethylphenol
* 4 2-[2-Chlorobenzoylamido]-4-chloro-5-[α-(2-chloro-4-t-amylphenoxy)octanamido]phenol
* 5 2-(2-Hydroxy-3-sec-5-t-butylphenyl)benzotriazole
* 6 2-(2-Hydroxy-5-t-butylphenyl)benzotriazole
* 7 2-(2-Hydroxy-3,5-di-t-butylphenyl)-6-chlorobenzotriazole

* 8 Di(2-ethylhexyl)phthalate
* 9 Trinonyl phosphate
*10 2,5-Di-t-octylhydroquinone
*11 Tricresyl phosphate
*12 Dibutyl phthalate
*13 Polyethyl acrylate
*14 5,5'-Diphenyl-9-ethyl-3,3'-disulfopropyloxacarbocyanine sodium salt
*15 3-(2-Chloro-5-tetradecanamidoanilino)-1-(2,4,6-trichlorophenyl)-2-pyrazolin-5-one
*16 3,3,3',3'-Tetramethyl-5,6,5',6'-tetrapropoxy-1,1'-bisspiroindane
*17 3-(2-Ethylhexyloxycarbonyloxy)-1-(3-hexadecyloxyphenyl)-2-pyrazoline
*18 2-Methyl-5-t-octylhydroquinone
*19 Trioctyl phosphate
*20 Triethylammonium 3-[2-(3-benzylrhodanin-5-ylidene)-3-benzoxazolinyl]propanesulfonate
*21 α-Pivaloyl-α-[(2,4-dioxo-1-benzyl-5-ethoxyhydantoin-3-yl)-2-chloro-5-(α-2,4-di-t-amylphenoxy)-butanamidoacetanilide
*22 5-Chloro-2-(2-hydroxy-3-t-butyl-5-t-octyl)phenylbenztriazole
*23 2,5-Di-sec-octylhydroquinone

*24
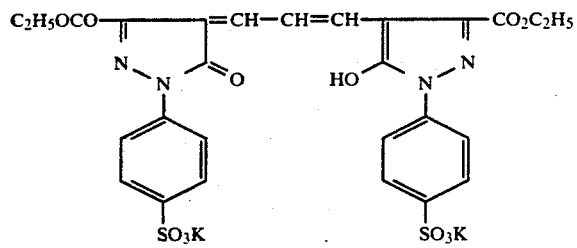

*25
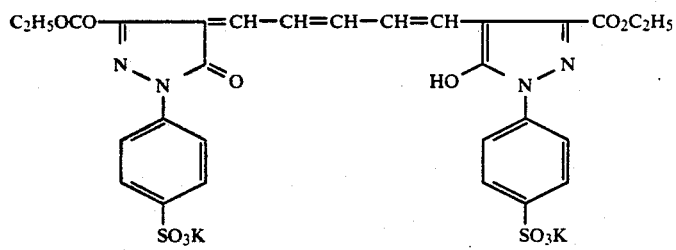

*26 1,2-bis(Vinylsulfonylacetamido)ethane
*27 7-Chloro-6-methyl-2-[1-{2-octyloxy-5-(2-octyloxy-5-t-octylbenzenesulfonamido}-2-propyl]-1H-pyrazolo[1,5-b][1,2,4]triazole A Macbeth color checker was photographed with the internal type reversal film RDP (made by the Fuji Photo Film Co., Ltd.) and printed onto the color reversal papers of Materials 2-1 to 2-15 by a subtractive color process using the color positive film obtained by CP-56P processing as original. The printing at this time was adjusted with a YMC filter in such a way that the neutral gray 5 of the Macbeth color checker became a gray with a density of 1.0 on the print. The development processing was carried out using the stages shown below. The Munsell chroma value was calculated from the measured value in order to observe the red, green and blue color reproduction of the image.

On the other hand, Materials 2-1 to 2-15 were exposed with a sensitometer at a color temperature of 3,200° K and 500 CMS passing through a plain glass and the same processing was carried out in order to observe the extent of staining of the image in each material caused by the remaining dyes after processing. The densities of the materials obtained were measured using a Macbeth densitometer.

In addition, the sharpness of Materials 2-1 to 2-15 were compared using C. T. F. (%) in a spatial frequency of 15 lines/mm in the same way as in Example 1.

The processing stages used in this example are shown below. Furthermore, the results are shown in Table II together with the layer composition.

Measurements were done after processing using an automatic development apparatus and the method mentioned below in such a way that the accumulated amount of the replenisher of the color developing solution was 3 times the amount of the tank solution.

| Processing Stage | Time (sec) | Temperature (°C.) | Tank Solution Tank Capacity (l) | Amount of Replenisher (ml/m²) |
|---|---|---|---|---|
| First Development | 75 | 38 | 8 | 300 |
| First Wash (1) | 45 | 33 | 5 | — |
| First Wash (2) | 45 | 33 | 5 | 5,000 |
| Reverse Exposure | 15 | 100 lux | | |
| Color Development | 135 | 38 | 15 | 330 |
| Second Wash | 45 | 33 | 5 | 1,000 |
| Bleach-Fixing (1) | 60 | 38 | 7 | — |
| Bleach-Fixing (2) | 60 | 38 | 7 | 220 |
| Third Wash (1) | 45 | 33 | 5 | |
| Third Wash (2) | 45 | 33 | 5 | |
| Third Wash (3) | 45 | 33 | 5 | 5,000 |
| Drying | 45 | 75 | | |

The first wash and the third wash respectively used the counter-flow method in this instance. Thus, the washing water was made to flow into the first wash (2) and the overflow from this was led into the first wash (1), and again, the washing water was made to flow into the third wash (3), the overflow from this was led into the third wash (2) and the overflow from the third wash (2) was led into the third wash (1).

The compositions of the various processing solutions were as given below.

| First Developer: | Tank Solution | Replenisher |
|---|---|---|
| Pentasodium Nitrilo-N,N,N-trimethylenephosphonate | 1.0 g | 1.0 g |
| Pentasodium Diethylenetriaminepentaacetate | 3.0 g | 3.0 g |
| Potassium Sulfite | 30.0 g | 30.0 g |
| Potassium Thiocyanate | 1.2 g | 1.2 g |
| Potassium Carbonate | 35.0 g | 35.0 g |
| Potassium Hydroquinone-monosulfonate | 25.0 g | 25.0 g |
| 1-Phenyl-4-hydroxymethyl-4-methyl-3-pyrazolidone | 2.0 g | 2.0 g |
| Potassium Bromide | 0.5 g | — |
| Potassium Iodide | 0.5 mg | — |
| Water to make | 1,000 ml | 1,000 ml |
| pH | 9.60 | 9.70 |

The pH was adjusted with either hydrochloric acid or potassium hydroxide.

| Color Development: | Tank Solution | Replenisher |
|---|---|---|
| Benzyl Alcohol | 15.0 ml | 18.0 ml |
| Diethylene Glycol | 12.0 ml | 14.0 ml |
| 3,6-Dithia-1,8-octanediol | 0.20 g | 0.25 g |
| Pentasodium Nitrilo-N,N,N-trimethylenephosphonate | 0.5 g | 0.5 g |
| Sodium Sulfite | 2.0 g | 2.5 g |
| Hydroxylaminosulfuric Acid | 3.0 g | 3.6 g |
| N-Ethyl-N-(β-methanesulfonamidoethyl)-3-methylaminoaniline Sulfate | 5.0 g | 8.0 g |
| Fluorescent Brightener (diaminostilbene-based) | 1.0 g | 1.2 g |
| Potassium Bromide | 0.5 g | — |
| Potassium Iodide | 1.0 mg | — |
| Water to make | 1,000 ml | 1,000 ml |
| pH | 10.25 | 10.40 |

The pH was adjusted with either hydrochloric acid or potassium hydroxide.

| Bleach-Fixing Solution | Tank Solution | Replenisher |
|---|---|---|
| Disodium Ethylenediaminetetraacetate Dihydrate | 5.0 g | Same as the tank solution |
| Ammonium (Ethylenediaminetetraacetato)Fe(III) Monohydrate | 80.0 g | |
| Sodium Sulfite | 15.0 g | |
| Ammonium Thiosulfate (700 g/liter) | 160 ml | |
| 2-Mercapto-1,3,4-triazole | 0.5 g | |
| Water to make | 1,000 ml | |
| pH | 6.50 | |

The pH was adjusted with either hydrochloric acid or potassium hydroxide.

TABLE II

| Test Material No. | Magenta Couplers Used in Layers 6 and 7 | Dyes Used in Layer 11 | Color Reproduction (chroma) | | | Staining after Processing | | | Sharpness | | |
|---|---|---|---|---|---|---|---|---|---|---|---|
| | | | Red | Green | Blue | C Density | M Density | Y Density | Cyan | Magenta | Yellow |
| 2-1 (Comparison) | *15 | None | 9.4 | 8.8 | 8.9 | 0.14 | 0.18 | 0.21 | 26.0 | 27.5 | 23.0 |
| 2-2 (Comparison) | *15 | 24, 25 only | 9.5 | 8.7 | 8.9 | 0.17 | 0.21 | 0.25 | 30.0 | 30.1 | 23.2 |
| 2-3 (Comparison) | *27 | None | 10.0 | 8.9 | 8.9 | 0.15 | 0.18 | 0.21 | 26.2 | 27.8 | 23.0 |
| 2-4 (Comparison) | *27 | 24, 25 only | 10.0 | 9.0 | 9.0 | 0.17 | 0.20 | 0.24 | 30.5 | 30.2 | 23.2 |
| 2-5 (Comparison) | *15 | I-5 | 9.9 | 9.1 | 8.9 | 0.15 | 0.18 | 0.22 | 30.5 | 30.4 | 23.3 |
| 2-6 (Comparison) | *15 | I-7 | 9.8 | 9.0 | 8.9 | 0.14 | 0.18 | 0.21 | 30.6 | 30.6 | 23.5 |
| 2-7 (Invention) | *27 | I-5 | 10.9 | 9.6 | 9.0 | 0.14 | 0.18 | 0.21 | 34.2 | 32.2 | 23.9 |
| 2-8 (Invention) | *27 | I-7 | 10.9 | 9.7 | 8.9 | 0.15 | 0.18 | 0.21 | 33.8 | 32.0 | 23.8 |
| 2-9 (Invention) | *27 | I-3 | 10.2 | 9.3 | 9.8 | 0.14 | 0.18 | 0.21 | 30.5 | 31.0 | 28.0 |
| 2-10 (Invention) | *27 | I-1 | 10.2 | 9.3 | 9.5 | 0.16 | 0.20 | 0.23 | 30.4 | 30.9 | 28.5 |
| 2-11 (Invention) | *27 | I-25 | 10.9 | 9.6 | 8.9 | 0.16 | 0.21 | 0.24 | 33.5 | 31.8 | 24.2 |
| 2-12 (Invention) | *27 | I-33 | 10.5 | 9.2 | 8.9 | 0.16 | 0.20 | 0.23 | 34.8 | 31.2 | 23.5 |
| 2-13 (Invention) | *27 | I-38 | 10.4 | 9.1 | 8.9 | 0.16 | 0.21 | 0.22 | 34.0 | 31.5 | 23.5 |
| 2-14 (Invention) | *27 | I-40 | 10.6 | 9.0 | 8.9 | 0.14 | 0.18 | 0.21 | 34.5 | 30.5 | 23.6 |
| 2-15 (Invention) | *27 | I-41 | 10.5 | 8.9 | 9.0 | 0.14 | 0.18 | 0.21 | 34.3 | 31.2 | 24.0 |

As is clear from the results in Table II, color reversal papers with excellent color reproduction and sharpness and without any influence of the whiteness of the white parts after processing are obtained according to this invention.

EXAMPLE 3

The coating of Layer 1 and of Layers 3 to 12 was carried out in the same way as for Example 2-15 with the coating changed to the dye layer with the composition shown below instead of Layer 2 of Example 2.

When processed in the same way as Example 2, the same results as those for Example 2-15 were obtained.

| Layer 2: Antihalation Layer | |
|---|---|
| Gelatin | 1 g/m$^2$ |
| Polymer Latex (mentioned below) | 0.16 g/m$^2$ |
| Dye (mentioned below (Dy-1)) | 24 mg/m$^2$ |
| Dye (mentioned below (Dy-2)) | 15 mg/m$^2$ |

Polymer Latex

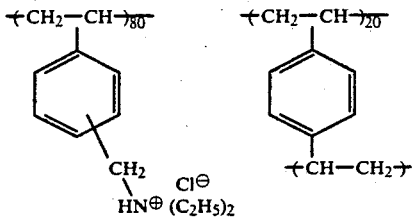

Dy-1

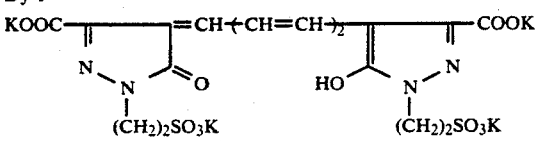

Dy-2

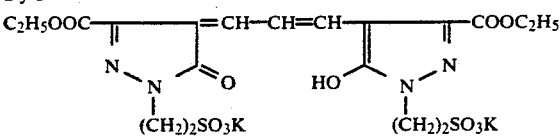

While the invention has been described in detail and with reference to specific embodiments thereof, it will be apparent to one skilled in the art that various changes and modifications can be made therein without departing from the spirit and scope thereof.

What is claimed is:

1. A silver halide color photographic material comprising a support having in a layer thereon at least a dye represented by general formula (I)

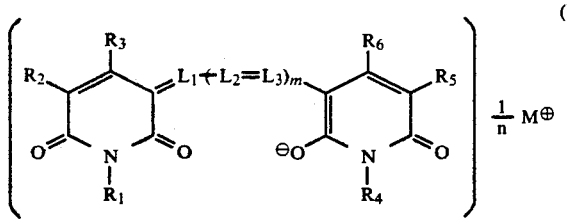

wherein

R$_1$ and R$_4$, which may be the same or different, each represents a hydrogen atom, an aliphatic group, an aromatic group, a heterocyclic group, —NR$_7$R$_8$, —NR$_7$CONR$_7$R$_8$, —NR$_8$COR$_9$ or —NR$_8$SO$_2$R$_9$;

R$_2$ and R$_5$, which may be the same or different, each represents a hydrogen atom, an aliphatic group, an aromatic group, a heterocyclic group, a cyano group, a sulfonic acid group, —NR$_7$R$_8$, —NR$_8$COR$_9$, —NR$_8$SO$_2$R$_9$, —NR$_7$CONR$_7$R$_8$, —COOR$_7$, —CONR$_7$R$_8$, —COR$_9$, —SO$_2$R$_9$ or —SO$_2$NR$_7$R$_8$;

R$_3$ and R$_6$, which may be the same or different, each represents a hydrogen atom, an aliphatic group, an aromatic group, a heterocyclic group, —OR$_7$, —COOR$_7$, —COR$_9$, —CONR$_7$R$_8$, —NR$_7$R$_8$, —NR$_8$COR$_9$ or —NR$_8$SO$_2$R$_9$, —NR$_7$CONR$_7$R$_8$, —SO$_2$R$_9$, SO$_2$NR$_7$R$_8$, —OR$_7$ or cyano group, where R$_7$ and R$_8$, which may be the same or different, each represents a hydrogen atom, an aliphatic group or an aromatic group;

R$_9$ represents an aliphatic group or an aromatic group; and

R$_7$ and R$_8$ or R$_8$ and R$_9$ may combine to form a 5 or 6-membered ring;

L$_1$, L$_2$ and L$_3$ each represents a methine group, m represents 0, 1 or 2; and M$^\oplus$ represents a cation of valency n where n represents 1, 2 or 3;

and least a coupler represented by general formula (II)

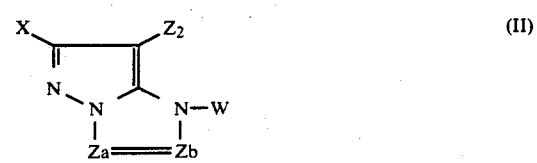

wherein X represents a hydrogen atom or a substituent group; Z$_2$ represents a hydrogen atom or coupling leaving group; W represents a hydrogen atom, an acyl group, an aliphatic sulfonyl group or an aromatic sulfonyl group; and Za and Zb represent methine, substituted methine or —N=; and dimers or higher oligomers involving X, Z$_2$ or Za, or Zb as substituted methine.

2. The silver halide color photographic material as claimed in claim 1, wherein in general formula (I), R$_1$ and R$_4$ each represents a group having at least one sulfonic acid group or carboxyl group, or R$_2$ and R$_5$ each represents a sulfonic acid group or a carboxyl group, or R$_2$ and R$_5$ each represents a group having at least one sulfonic acid group or carboxyl group, or R$_3$ and R$_6$ each represents a carboxyl group, or R$_3$ and R$_6$ each represents a group having at least one sulfonic acid group or carboxy group.

3. The silver halide color photographic material as claimed in claim 1, wherein the aliphatic group represented by R$_1$, R$_2$, R$_3$, R$_4$, R$_5$, R$_6$, R$_7$, R$_8$ or R$_9$ are each an unsubstituted alkyl group, a substituted alkyl group substituted with at least one of a halogen atom, a phenyl group, a hydroxyl group, a cyano group, a carboxyl group, a sulfonic acid group, an alkoxy group, an amino group, an ester group or a cycloalkyl group; the aromatic group represented by R$_1$, R$_2$, R$_3$, R$_4$, R$_5$, R$_6$, R$_7$, R$_8$ or R$_9$ are each an unsubstituted aryl group or a substituted aryl group substituted with at least one of a sulfonic acid group, a carboxyl group, an alkoxy group, an alkyl group, a hydroxyl group, an amino group, a cyano group or an ester group; the heterocyclic groups represented by R$_1$, R$_2$, R$_3$, R$_4$, R$_5$ or R$_6$ are each a 5- or 6-membered heterocyclic group containing at least one nitrogen atom; the methine groups represented by L$_1$, L$_2$ or L$_3$ represent unsubstituted methine groups or substituted methine groups.

4. The silver halide color photographic material as claimed in claim 1, wherein the coupler represented by formula (II) is selected from the group consisting of compounds of formula (IIa) to (IIe):

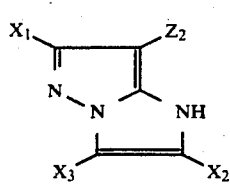 (IIa)

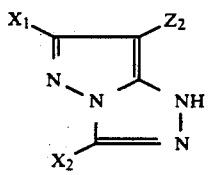 (IIb)

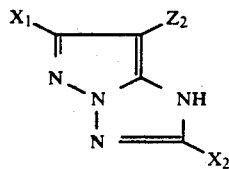 (IIc)

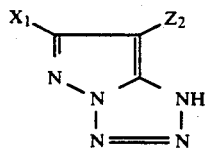 (IId)

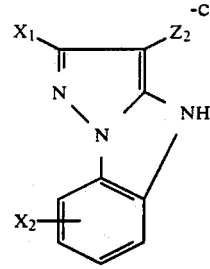 (IIe)

wherein $X_1$, $X_2$ and $X_3$ may be the same or different and each represents a hydrogen atom, a halogen atom, an alkyl group, an aryl group, a heterocyclic group, a cyano group, an alkoxy group, an aryloxy group, a heterocyclic oxy group, an acyloxy group, a carbamoyloxy group, a silyloxy group, a sulfonyloxy group, an acylamino group, an anilino group, a ureido group, an imido group, a sulfamoylamino group, a carbamoylamino group, an alkylthio group, an arylthio group, a heterocyclic thio group, an alkoxycarbonylamino group, an aryloxycarbonylamino group, a sulfonamido group, a carbamoyl group, an acyl group, a sulfamoyl group, a sulfonyl group, a sulfinyl group, an alkoxycarbonyl group, and an aryloxycarbonyl group each of which groups may be substituted; $Z_2$ represents a hydrogen atom; a halogen atom; a carboxyl group; or a group which bonds with the carbon in the coupling position via an oxygen atom, a nitrogen atom or a sulfur atom and is released upon coupling; and $X_1$, $X_2$, $X_3$ and $Z_2$ may be divalent groups forming a dimer; and the coupling residual groups represented by general formulae (IIa) to (IIe) may form polymer couplers which are present in the main chain or side chains of the polymer with $X_1$, $X_2$, $X_3$ and $Z_2$ as a result each representing a vinyl group or a linking group.

5. The silver halide color photographic material as claimed in claim 1, wherein the dye represented by general formula (I) is present in an amount so as to provide an optical density within the range of 0.05 to 3.0.

* * * * *